United States Patent
Okamura et al.

(10) Patent No.: US 11,960,928 B2
(45) Date of Patent: Apr. 16, 2024

(54) EVENT MONITORING SYSTEM AND EVENT MONITORING METHOD

(71) Applicant: Hitachi, Ltd., Tokyo (JP)

(72) Inventors: Taku Okamura, Tokyo (JP); Takashi Tameshige, Tokyo (JP); Mitsuhiro Nagata, Tokyo (JP); Hideto Kurose, Tokyo (JP); Mineyoshi Masuda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 447 days.

(21) Appl. No.: 17/477,401

(22) Filed: Sep. 16, 2021

(65) Prior Publication Data
US 2022/0300320 A1    Sep. 22, 2022

(30) Foreign Application Priority Data

Mar. 17, 2021    (JP) ................... 2021-043298

(51) Int. Cl.
*G06F 9/46*    (2006.01)
*G06F 9/48*    (2006.01)
*G06F 9/54*    (2006.01)

(52) U.S. Cl.
CPC ............ *G06F 9/4881* (2013.01); *G06F 9/542* (2013.01); *G06F 9/546* (2013.01)

(58) Field of Classification Search
CPC ................................. G06F 9/542; G06F 9/546
See application file for complete search history.

(56) References Cited

U.S. PATENT DOCUMENTS

2020/0012543 A1    1/2020   Masuda et al.

FOREIGN PATENT DOCUMENTS

JP    2020009154 A    1/2020

*Primary Examiner* — Gregory A Kessler
(74) *Attorney, Agent, or Firm* — Procopio, Cory, Hargreaves & Savitch LLP

(57) ABSTRACT

An event monitoring system includes a processor and a storage unit. The storage unit holds an event message including a character string related to an event occurring in an information system and guide information including one or more guides. The guide includes a guide message including a predetermined character string, notified in response to the event, and information regarding a coping method for the event. The processor compares the event message and the guide, associates the guide with the event in a case where the guide further includes information for identifying a variable portion of the guide message and a portion other than the variable portion of the guide message coincides with a portion other than a portion corresponding to the variable portion in the event message, and receives an input of information indicating a correct answer of a guide to be associated with the event in a case where the guide does not include the information for identifying the variable portion.

13 Claims, 24 Drawing Sheets

FIG. 3

| GUIDE ID 2210 | GUIDE MESSAGE 2220 | SECOND GUIDE MESSAGE 2230 | WILDCARD RANGE 2240 | THRESHOLD 2250 | COPING METHOD 2260 | NOTIFICATION NECESSITY DETERMINATION RULE 2270 | NOTIFICATION DESTINATION 2280 |
|---|---|---|---|---|---|---|---|
| G1 | ERROR HAS OCCURRED IN DEVICE S1 | n/a | n/a | 0.8 | n/a | IF arrive 5 times within 5 mins THEN Escalation | xxx.teamA@yyy |
| G2 | JOB NET (REPORT GENERATION) HAS ABNORMALLY ENDED | JOB NET (REPORT GENERATION) HAS ABNORMALLY ENDED | n/a | n/a | n/a | IF... THEN ... | xxx.teamB@yyy |
| G3 | JOB NET (JOB NET NAME) HAS ABNORMALLY ENDED | JOB NET (*) HAS ABNORMALLY ENDED | n/a | 0.5 | n/a | IF... THEN ... | xxx.teamB@yyy |
| G4 | REQUEST FROM HOST (CONNECTION SOURCE IP ADDRESS) HAS BEEN IGNORED | REQUEST FROM HOST (*) HAS BEEN IGNORED | xxx.xxx.xxx.0~100 | 0.6 | REFER TO MANUAL A AND TAKE COUNTERMEASURE WRITTEN THEREIN | n/a | xxx.teamC@yyy |
| G5 | REQUEST FROM HOST (CONNECTION SOURCE IP ADDRESS) HAS BEEN IGNORED | REQUEST FROM HOST (*) HAS BEEN IGNORED | xxx.xxx.xxx.10 1~255 | 0.7 | ... | n/a | xxx.teamB@yyy |
| ... | ... | ... | ... | ... | ... | ... | ... |

| EVENT ID | GUIDE ID | SIMILARITY SCORE | ASSIGNMENT FLAG WITH UNIQUE KEYWORD | ASSIGNMENT FLAG WITH SECOND GUIDE MESSAGE | NOTIFICATION NECESSITY DETERMINATION FLAG | FEEDBACK RESULT |
|---|---|---|---|---|---|---|
| E1 | G1 | 0.9 | N | Y | Y | CORRECT ANSWER |
|  | G3 | 0.7 | N | Y | N | INCORRECT ANSWER |
| E2 | G4 | 0.55 | Y | N | Y | CORRECT ANSWER |
|  | G5 | 0.4 | N | N | N | INCORRECT ANSWER |
| E3 | G6 | n/a | n/a | n/a | n/a | CORRECT ANSWER |
| ... | ... | ... | ... | ... | ... |  |

FIG. 22

| GUIDE ID 2210 | GUIDE MESSAGE 2220 | GUIDE MESSAGE VERSION 2225 | SECOND GUIDE MESSAGE 2230 | SECOND GUIDE MESSAGE VERSION 2235 | WILDCARD RANGE 2240 | THRESHOLD 2250 | COPING METHOD 2260 | NOTIFICATION NECESSITY DETERMINATION RULE 2270 | NOTIFICATION DESTINATION 2280 |
|---|---|---|---|---|---|---|---|---|---|
| G1 | ERROR HAS OCCURRED IN DEVICE S1 | V1.5 | n/a | n/a | n/a | 0.8 | n/a | IF arrive 5 times within 5 mins THEN Escalation | xxx.teamA @yyy |
| G2 | JOB NET (REPORT GENERATION) HAS ABNORMALLY ENDED | V1.6 | JOB NET (REPORT GENERATION) HAS ABNORMALLY ENDED | V1.5 | n/a | n/a | n/a | IF... THEN ... | xxx.teamB @yyy |
| G5 | JOB NET (JOB NET NAME) HAS ABNORMALLY ENDED | V1.6 | JOB NET (*) HAS ABNORMALLY ENDED | V1.5 | n/a | 0.5 | n/a | IF... THEN ... | xxx.teamB @yyy |
| G3 | REQUEST FROM HOST (CONNECTION SOURCE IP ADDRESS) HAS BEEN IGNORED | V1.5 | REQUEST FROM HOST (*) HAS BEEN IGNORED | V1.5 | xxx.xxx.xxx.0 ~100 | 0.6 | REFER TO MANUAL A AND TAKE COUNTERMEASURE WRITTEN THEREIN | n/a | xxx.teamC @yyy |
| G4 | REQUEST FROM HOST (CONNECTION SOURCE IP ADDRESS) HAS BEEN IGNORED | V1.5 | REQUEST FROM HOST (*) HAS BEEN IGNORED | V1.5 | xxx.xxx.xxx.1 01~255 | 0.7 | ... | n/a | xxx.teamB @yyy |
| ... | ... | ... | ... | ... | ... | ... | ... | ... | ... |

2200A

EVENT MONITORING SYSTEM AND EVENT MONITORING METHOD

CLAIM OF PRIORITY

The present application claims priority from Japanese patent application JP 2021-043298 filed on Mar. 17, 2021, the content of which is hereby incorporated by reference into this application.

BACKGROUND OF THE INVENTION

1. Field of the Invention

The present invention relates to a technique for supporting a task of monitoring an event occurring in an information system.

2. Description of the Related Art

One of operational tasks of an information system (information technology (IT) system) is an event monitoring task. In critical IT systems used for core business or the like in companies, an event is issued when a phenomenon, such as malfunction and abnormality, occurs.

The event is data issued by a program called an agent mounted to the IT system. The agent is intended for monitoring elements constituting the IT system, for example, hardware or software such as an operating system (OS) and middleware, observes a performance and a state, such as life, of an object to be monitored, and acquires log data output from the object to be monitored. When the observed state or the acquired log data corresponds to a specific condition, the agent issues an event representing the occurrence of a phenomenon corresponding to the specific condition. The event is data for transmitting the occurring phenomenon to a person, and thus, usually includes character string data representing a place where the phenomenon has occurred, the object to be monitored where the phenomenon has occurred, and the occurring phenomenon to be read and understandable by a person. This character string data is referred to as an event message. The event issued by the agent is sent to a management computer.

The management computer stores events received from each agent, and centrally manages the stored events. Further, a monitoring operator (human) monitors events received from each agent in the management computer. The monitoring operator confirms the received events one by one, and notifies a superior administrator of an event if finding the event that leads to a serious failure. The notification of the event to the superior administrator performed by the monitoring operator is referred to as an escalation. The monitoring operator determines whether the escalation is necessary according to an event handling guide.

The event handling guide describes a guide indicating how to handle an event for each event. Each guide includes a guide message which is a sample of an event message of the event to be handled and a criterion for determining whether the event is to be escalated.

As work performed by the monitoring operator, when a new event arrives at the management computer, the monitoring operator first searches for a guide that matches the event from the event handling guide. Specifically, the monitoring operator finds a guide having a guide message that is close to the content of the event message included in the event with the use of visual inspection of a document, search of the document, or the like. The monitoring operator further determines the necessity of the escalation according to the determination criterion included in the found guide, and performs the escalation as needed.

An event monitoring work includes a series of tasks related to event monitoring as described above. It is possible to detect a failure of the IT system at an early stage and appropriately handle the failure by appropriately continuing the event monitoring task. In other words, the monitoring operator needs to always perform the event monitoring task as long as the IT system is operated. Therefore, the labor cost of the event monitoring task is extremely great.

In particular, significant cost is required for the monitoring operator to perform the work of finding the guide handling the event. If an IT system to be monitored is large-scale or the number of IT systems to be monitored is large, the number of guides included in the event handling guide also ranges from thousands to several tens of thousands, and it takes long time for the work of searching for the guide handling the event in some cases. An increase in the work time not only increases the cost but also causes a delay in handling the failure.

Therefore, a technique for supporting the event monitoring task with a computer has been proposed. JP 2020-9154 A discloses a technique in which a threshold regarding the similarity between a guide message and an event message is provided for each guide, and a guide is provided to an event whose similarity with the guide exceeds the threshold.

SUMMARY OF THE INVENTION

If the technique of JP 2020-9154 A is used, a guide message similar to an event message can be automatically identified. As a result, it is possible to assist the monitoring operator in the work of finding the guide for the event.

However, there is a case where a guide message includes a portion (hereinafter, referred to as "wildcard") to be replaced depending on a situation. In the technique of JP 2020-9154 A, the presence of the wildcard is not considered and the similarity determination is performed by comparison between simple character strings, and thus, there may occur a problem that it is difficult to correctly assign an event in a case where a wildcard is present in a guide message.

An example of the guide message including the wildcard will be briefly described. It is assumed that there are three types of guides including a guide message A "Job net (backup) has abnormally ended", a guide message B "Job net (job count) has abnormally ended", and a guide message C "Job net (job name) has abnormally ended". Here, a portion "(job net name)" of the guide message C is a wildcard, and may include an arbitrary character string.

In such a situation, it is assumed that an event having an event message "Job net (event generation) has abnormally ended" arrives as a new arrival event. Since the portion "(event generation)" of the event message corresponds to "(job net name)" which is a wildcard portion of the guide message C, the correct guide to be assigned to this event is the guide message C.

In the technique of JP 2020-9154 A, first, the similarity between the event message and each of the guide messages A, B, and C is calculated. The similarity between the event message and the guide message is also referred to as a similarity score, and is an index indicating a degree of similarity between the guide message and the event message. For example, in JP 2020-9154 A, the similarity score is calculated based on a ratio of words included in the event message among words constituting the guide message. Next, in a case where the similarity exceeds a threshold of each guide, the guide is assigned.

When the wildcard is correctly considered, the similarity of the guide message C with the event message should be higher than those of the guide messages A and B. In the technique of JP 2020-9154 A, however, a wildcard is not considered and a character string itself is recognized, and thus, "(job net name)" and "(event generation)" are recognized as different character strings. As a result, all the similarities of the guide messages A, B, and C with the event message have the same value, and it is difficult to assign only the guide C as the correct guide in a case where the guides A, B, and C have similar thresholds because all the similarities are equal to or more than the threshold or equal to or less than the threshold.

An object of the present invention is to provide a technique for improving accuracy in determining association of a guide with an event that has occurred in an information system even in a case where a wildcard is included in a guide message.

An event management device according to one aspect of the present invention includes a processor and a storage unit. The storage unit holds an event message including a character string related to an event occurring in an information system and guide information including one or more guides. The guide includes a guide message including a predetermined character string, notified in response to the event, and information regarding a coping method for the event. The processor compares the event message and the guide, associates the guide with the event in a case where the guide further includes information for identifying a variable portion of the guide message and a portion other than the variable portion of the guide message coincides with a portion other than a portion corresponding to the variable portion in the event message, and receives an input of information indicating a correct answer of a guide to be associated with the event in a case where the guide does not include the information for identifying the variable portion.

According to the aspect of the present invention, it is possible to appropriately determine whether to assign the guide to the event for each guide even in the case where the wildcard is included in the guide message.

Other objects, configurations, and effects which have not been described above become apparent from embodiments to be described hereinafter.

BRIEF DESCRIPTION OF THE DRAWINGS

FIG. 3 is a table illustrating a configuration example of a guide table according to the first embodiment;

FIG. 5 is a table illustrating a configuration example of an assignment result table according to the first embodiment;

FIG. 22 is a table illustrating a configuration example of a guide table according to the second embodiment;

DESCRIPTION OF THE PREFERRED EMBODIMENTS

Hereinafter, some embodiments of the present invention will be described. Incidentally, the following embodiments do not limit the invention according to the claims, and further, all of the elements described in the embodiments and combinations thereof are not necessarily indispensable for the solution of the invention. Further, an ID (identifier), a number, and the like are used as information for identifying a certain object, but various types of identification information may be used without being limited thereto.

First Embodiment

Figure 1:
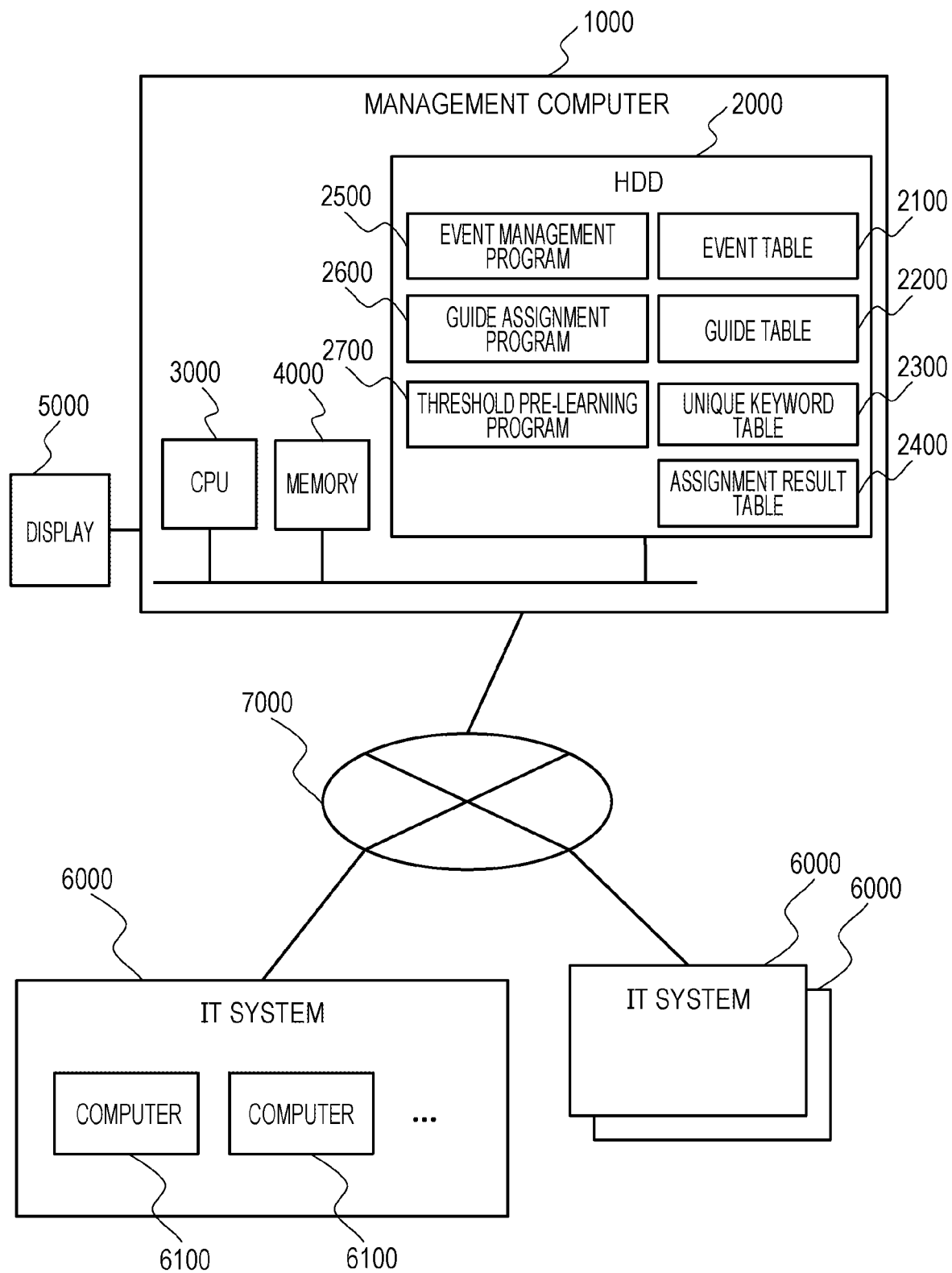
FIG. 1 is a block diagram illustrating a configuration of an event monitoring system according to a first embodiment.

FIG. 1 is a block diagram illustrating a configuration of an event monitoring system according to a first embodiment. The event monitoring system includes a management computer 1000 and a display 5000, and monitors an event from IT systems 6000. One of the IT systems 6000 includes a plurality of computers 6100.

The management computer 1000 is a computer that executes an event management program 2500, a guide assignment program 2600, and a threshold pre-learning program 2700.

The management computer 1000 is connected to the IT system 6000 to be monitored via a local area network (LAN) 7000. The management computer includes a hard disk drive (HDD) 2000, a CPU 3000, a memory 4000, and a display 5000. The HDD 2000 stores the event management program 2500, the guide assignment program 2600, and the threshold pre-learning program 2700, and an event table 2100, a guide table 2200, a unique keyword table 2300, and an assignment result table 2400 in which data to be referred to by these programs has been recorded. The event management program 2500, the guide assignment program 2600, and the threshold pre-learning program 2700 are loaded into the memory 4000 and executed on the CPU 3000. That is, processing executed by each of the above-described programs in the following description is actually executed by the CPU 3000 according to each program. Further, functions of the above-described programs are not limited to those implemented by a single device, and may be implemented by a plurality of devices connected to be capable of communicating with each other.

The IT system 6000 is an object to be monitored. An event issued by an agent (not illustrated) on the IT system 6000 is received by the management computer 1000. The monitoring operator performs an event monitoring task while watching the display of the display 5000.

As an example, the IT system 6000 includes the plurality of computers 6100 and a software program (not illustrated) operating thereon. The computer 6100 is a computer having components similar to those of the management computer 1000 as hardware. On the computer 6100, an OS (not illustrated) and an agent (not illustrated) that monitors operations of the hardware and software operate. When the performance and life of each object to be monitored satisfy a specific condition, the agent generates an event and sends the event to the management computer 1000.

When an event is issued from the IT system 6000, the event management program 2500 on the management computer 1000 receives the event and stores the event in the event table 2100. The guide assignment program 2600 reads data of a guide and data of a unique keyword from the guide table 2200 and the unique keyword table 2300, respectively, performs guide assignment processing for a new arrival event in the event table 2100, and stores the result in the assignment result table 2400. The threshold pre-learning program 2700 reads data of a guide and data of a past event from the guide table 2200 and the assignment result table 2400 or a table (not illustrated) storing the past event record, performs pre-learning of a threshold using the past event, and stores the result in the guide table 2200.

An event and a result of assignment to the event are displayed on the display 5000. The monitoring operator confirms the display, determines whether the assignment of the guide to the event is appropriate, and, if there is an error in the assignment, inputs feedback of such a fact to the management computer 1000 using an input device (not illustrated).

Figure 2:
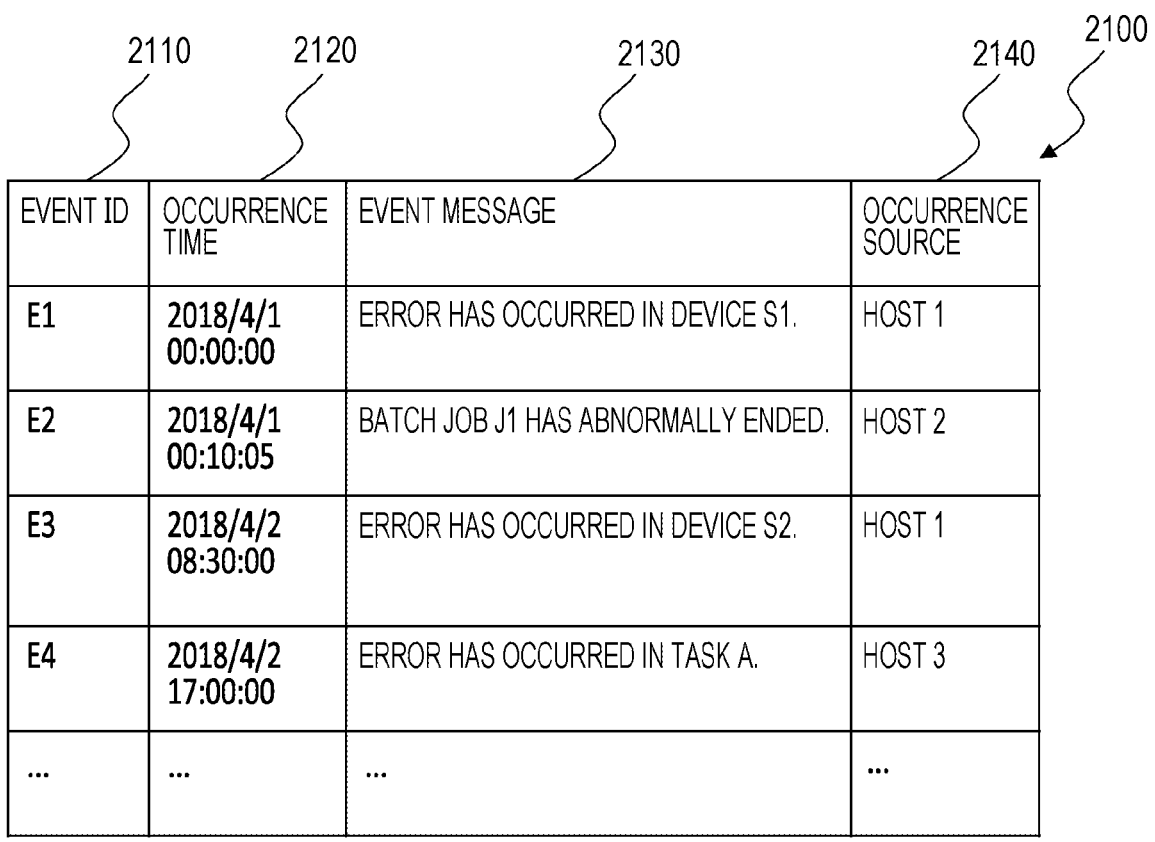
FIG. 2 is a table illustrating a configuration example of an event table according to the first embodiment.

FIG. 2 is a table illustrating a configuration example of the event table 2100 according to the first embodiment. The event table 2100 is a table for storing data of each event sent from the agent.

In the event table 2100, a row is created for each event. Each row of the event table 2100 stores, for example, an event ID 2110 for uniquely identifying an individual event, an occurrence time 2120 of the event, an event message 2130 indicated by a character string for notifying a person of an occurring phenomenon, and an occurrence source 2140 indicating a computer 6100 in which the event has occurred.

Further, the event table 2100 can store various types of attribute data of an event, such as an agent type indicating a type of agent that has issued the event without being limited to the data illustrated in FIG. 2.

FIG. 3 is a table illustrating a configuration example of the guide table 2200 according to the first embodiment. The guide table 2200 is a table that stores data of guides used by the monitoring operator to determine whether to escalate an event. The escalation is that the monitoring operator notifies a superior administrator of the event. The monitoring operator determines the necessity of the escalation according to a guide included in an event handling guide, and notifies the administrator who is an escalation destination.

In the guide table 2200, a row is created for each guide. Each row of the guide table 2200 stores, for example, a guide ID 2210 which is an identifier uniquely assigned to the guide, a guide message 2220 which is a sample of an event message of an event corresponding to the guide, a second guide message 2230 which is a message obtained by converting a wildcard included in the guide message into a machine-recognizable format, for example, a regular expression, a wildcard range 2240 indicating a range in a case where a range, such as a specific ID, is designated in the wildcard, a threshold 2250 which is a numerical value used in determination for extraction of a candidate guide, a coping method 2260 for allowing a person to read and take a countermeasure for the received event, a notification necessity determination rule 2270 for determining the necessity of an escalation of the received event by a program, and a notification destination 2280 indicating an address of an escalation destination.

The second guide message 2230 stores a message obtained by converting a wildcard included in the guide message 2220 into a machine-recognizable format, for example, a regular expression. FIG. 3 illustrates an example of the second guide message 2230 in which a wildcard is replaced with a regular expression. In an example of a guide with the guide ID 2210 of "G3", a portion of "job net name" in the guide message 2220 is a wildcard, and a message replaced with ".*" representing the wildcard in the regular expression is stored in the second guide message 2230. When the second guide message 2230 has not been created, "n/a" is stored as in the second guide message 2230 of a guide with the guide ID 2210 of "G1".

If the second guide message 2230 is created for a guide in which a wildcard does not exist in the guide message 2220 as in an example of a guide with the guide ID 2210 of "G2", the same message as the guide message 2220 is stored in the second guide message 2230. Although FIG. 3 illustrates an example of the second guide message 2230 in which the wildcard is replaced with the regular expression, a method for expressing the wildcard is not limited to the regular expression.

Further, the second guide message 2230 is an example of information for designating a variable portion of a character string of the guide message 2220, and the variable portion of the character string of the guide message 2230 may be designated by a method other than holding the second guide message 2220.

When a range, such as a specific ID, is designated in a wildcard and it is necessary to distinguish between guides by the range such as the ID, the wildcard range 2240 indicates the range such as the ID. For example, in the example of FIG. 3, guides with the guide IDs 2210 of "G4" and "G5" have the same guide message 2220, and a portion of "connection source IP address" is the wildcard. In such an example, it is difficult to distinguish between the two guides even if the guide message 2220 or the second guide message 2230 is used. A portion for distinguishing between the two guides is an IP address number included in the wildcard "connection source IP address", and it is determined to assign the guide with the guide ID 2210 of "G4" if the end of the number is 0 to 100 and to assign the guide with the guide ID 2210 of "G5" if the end of the number is 101 to 255.

Note that the wildcard range 2240 is an example of information for designating a character string to be allowed in a wildcard portion, and the character string to be allowed may be designated by a method other than the designation of the value range as described above. For example, when only a plurality of predetermined character strings are allowed in the wildcard portion, those character strings may be held as a wildcard range.

The threshold 2250 is an index related to the similarity between an event message and a guide message, and numerical values between 0.0 and 1.0 are stored in the example of FIG. 3. In the present technology, the threshold 2250 is used to narrow down guides to be assigned to a new arrival event from a large number of guides included in the guide table 2200 up to several to several tens of guides. When the similarity between the event message and the guide message exceeds the threshold 2250 of a guide, the guide assignment program 2600 determines the guide as a "candidate guide". Unique keyword matching processing and second guide message matching processing, which will be described later, are performed in order to select a guide to be finally assigned to the new arrival event from the narrowed candidate guides.

The similarity between the event message and the guide message is also referred to as a similarity score, is an index indicating a degree of similarity between the guide message and the event message, and has a higher value if the degree of similarity is higher. In the calculation of the similarity score, an index indicating a ratio of words included in an event message among words constituting a guide message may be used as described in JP 2020-9154 A, or other methods may be used.

The threshold 2250 is learned in advance by the threshold pre-learning program 2700. This processing is executed, for example, when a function of automatically assigning an event to a guide by the management computer 1000 is enabled for the first time. Alternatively, this processing may be executed periodically. If the past events includes an event to which a certain guide needs to be assigned, a similarity score indicating a similarity between an event message of the event and a guide message of the guide should be higher than similarity scores indicating similarities of the guide with other events. As the threshold is set to a value slightly lower than such a similarity score, the candidate guides can be successfully narrowed down by the threshold. The threshold pre-learning by the threshold pre-learning program 2700 may be performed using a method described in JP 2020-9154 A or using another method. When the threshold is unlearned and there is no valid number in the threshold, "n/a" is stored.

In the notification necessity determination rule 2270, an IF Then rule for determining the escalation necessity by a program is written in a case where a notification rule to the superior administrator can be written by the program. In this case, "n/a" is stored in the coping method 2260. On the other hand, in a case where it is difficult to draw the rule for determination by the program in the notification necessity determination rule 2270, "n/a" is stored, and a countermeasure to be executed by a person for an event is written in the coping method 2260.

Figure 4:
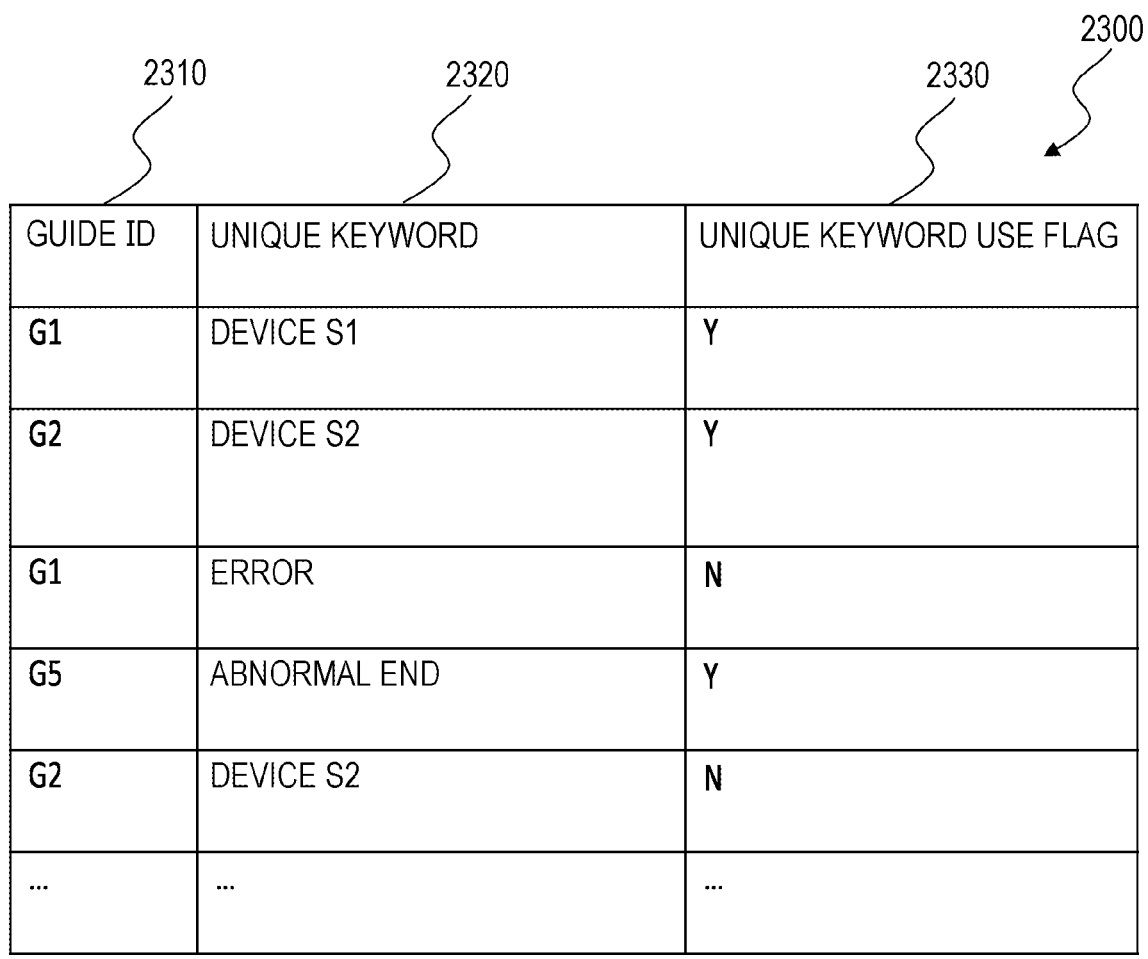
FIG. 4 is a table illustrating a configuration example of a unique keyword table according to the first embodiment.

FIG. 4 is a table illustrating a configuration example of the unique keyword table 2300 according to the first embodiment. The unique keyword table 2300 stores information of a unique keyword for each guide and information as to whether to use the unique keyword in the future. Each row of the unique keyword table 2300 stores, for example, a guide ID 2310, a unique keyword 2320 of the guide, and a unique keyword use flag 2330 indicating whether the unique keyword is to be used in the future. The guide ID 2310 has the same format as the guide ID 2210 of the guide table 2200. A method for extracting a unique keyword included in the unique keyword table 2300 and a value stored in the unique keyword use flag will be described in detail later.

The unique keyword is a word uniquely possessed by a guide message among candidate guides (that is, not included in the other candidate guides). If an event message includes a unique keyword included in a certain guide message, a guide to be assigned can be selected from among the candidate guides.

The unique keyword is not uniquely determined for each guide. One guide message may have a plurality of unique keywords or no unique keyword. Even a guide with the same guide ID 2310 is stored in another new row each time another unique keyword 2320 is extracted, and has a different unique keyword use flag 2330 for each unique keyword 2320. FIG. 4 illustrates an example in which a guide with a guide ID "G1" has a plurality of unique keywords 2320 of "device S1" and "error".

FIG. 5 is a table illustrating a configuration example of the assignment result table 2400 according to the first embodiment. The assignment result table 2400 is a table that stores an assignment result of an extracted candidate guide and feedback data from the monitoring operator for each event. Only the feedback result is stored if there is no candidate guide.

The assignment result table 2400 stores an assignment result of a candidate guide for an event in each row. Each row of the assignment result table stores, for example, an event ID 2410, a guide ID 2420 of a candidate guide for a corresponding event, a similarity score 2430, an assignment flag 2440 with a unique keyword, an assignment flag 2450 with a second guide message, a notification necessity determination flag 2460, and a feedback result 2470.

The assignment flag 2440 with the unique keyword indicates whether a corresponding guide has been assigned to a new arrival event with the unique keyword (that is, the guide has been assigned to the new arrival event based on the fact that the unique keyword of the guide is included in an event message). A case where the assignment flag 2440 with the unique keyword is "Y" means that the guide has been assigned to the new arrival event with the unique keyword, and a case where the assignment flag 2440 with the unique keyword is "N" or "n/a" means that the guide has not been assigned to the new arrival event with the unique keyword.

The assignment flag 2450 with the second guide message indicates whether a corresponding guide has been assigned to a new arrival event by assignment using the second guide message. A case where the assignment flag 2450 with the second guide message is "Y" means that the guide has been assigned to the new arrival event with the second guide message, and a case where the assignment flag 2450 with the second guide message is "N" or "n/a" means that the guide has not been assigned to the new arrival event with the second guide message.

The notification necessity determination flag 2460 indicates whether an assigned guide satisfies the notification necessity determination rule 2270 in the guide table 2200. A case where the notification necessity determination flag 2460 is "Y" indicates that the notification necessity determination rule 2270 is satisfied, and a case where the notification necessity determination flag 2460 is "N" indicates that the notification necessity determination rule 2270 is not satisfied. Further, a case where the notification necessity determination flag 2460 is "n/a" indicates that there is no candidate guide and there is no guide to be assigned.

The feedback result 2470 stores a feedback result regarding correctness by the monitoring operator. In a case where the monitoring operator determines that a corresponding guide is a guide to be assigned to an event, a "correct answer" is stored, and otherwise, an "incorrect answer" is stored.

If there are a plurality of candidate guides for one event, all results for the candidate guides are stored, and thus, a plurality of guide assignment results may be stored. Further, in a case where there is no candidate guide and there is no guide to be assigned, "n/a" is stored in the similarity score 2430, the assignment flag 2440 with the unique keyword, the assignment flag 2450 with the second guide message, and the notification necessity determination flag 2460, and only the guide ID 2420 and the feedback result 2470 of a correct guide for an event fed back by the monitoring operator are stored. In this case, the "correct answer" is always stored in the feedback result 2470.

Figure 6:
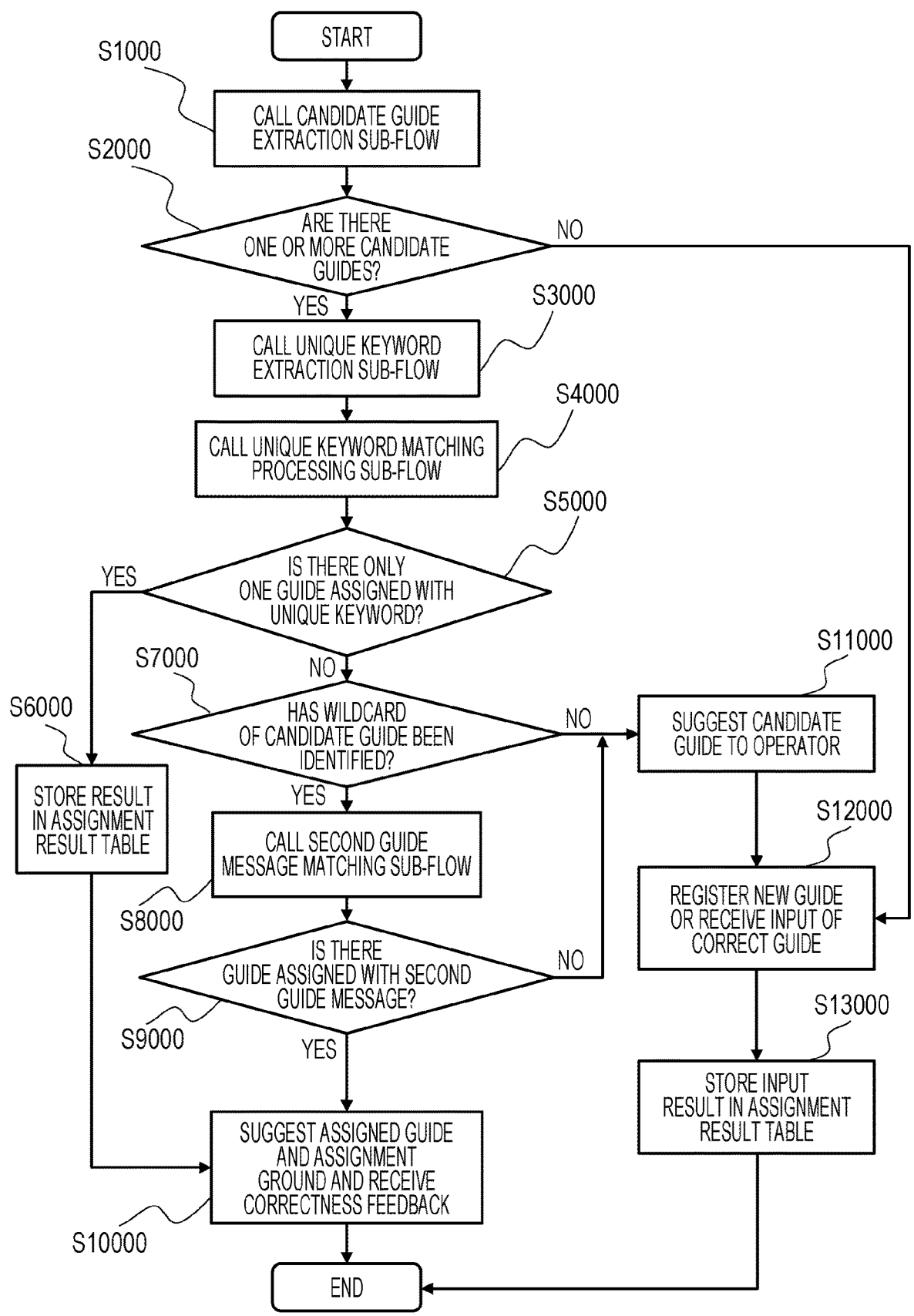
FIG. 6 is a flowchart illustrating an example of a flow of guide assignment processing for a new arrival event according to the first embodiment.

FIG. 6 is a flowchart illustrating an example of a flow of guide assignment processing for a new arrival event according to the first embodiment. This processing is executed by the guide assignment program 2600 as processing for an event after the event management program 2500 receives the new arrival event and registers data of the event in the event table 2100.

In step S1000, the guide assignment program 2600 executes a candidate guide extraction sub-flow, extracts a candidate guide for the event, and stores the extracted guide in the assignment result table. Details of the candidate guide extraction sub-flow will be described later (see FIG. 7).

In step S2000, the guide assignment program 2600 refers to the assignment result table 2400 and determines whether there is one or more candidate guides extracted as assignment candidates in step S1000. If a specific value is stored in the guide ID 2420 and the similarity score 2430 as the assignment result for the new arrival event, the guide assignment program 2600 determines that there is one or more candidate guides, and proceeds to a unique keyword extraction sub-flow execution step S3000. Otherwise, the guide assignment program 2600 determines that there is no guide to be assigned, and proceeds to step S12000.

When it is determined in step S2000 that there is one or more candidate guides, the guide assignment program 2600 performs matching processing using a unique keyword on the candidate guides in steps S3000 to S6000. In a case where a condition to be described later is satisfied, matching processing using a second guide message is performed in steps S7000 to S9000. The guide assignment program 2600 selects a guide to be finally assigned to the new arrival event from among the candidate guides extracted in step S1000 by the matching processing. However, attention is required since even a guide matched using the unique keyword or the second guide message is not always determined as the guide to be finally assigned to the new arrival event.

In the matching processing of the guide using the unique keyword in steps S3000 to S6000, only when there is only one guide matched to the new arrival event using the unique keyword, the guide assignment program 2600 determines the guide as the guide to be assigned to the new arrival event. On the other hand, when there is no guide or a plurality of guides matched to the new arrival event using the unique keyword or there are a plurality of guides, all the candidate guides are returned to the matching processing using the second guide message in steps S7000 to S9000 regarding that it is difficult to determine the guide to be assigned to the new arrival event by the matching using the unique keyword.

In the matching processing using the second guide message in steps S7000 to S9000, the guide assignment program 2600 determines whether there is only one guide matched to the new arrival event by the matching using the second guide message. When there is only one guide matched to the new arrival event by the matching using the second guide message, the guide assignment program 2600 determines the guide as the guide to be assigned to the new arrival event. On the other hand, when there are a plurality of guides matched to the new arrival event by the matching using the second guide message, the guide assignment program 2600 determines whether to assign each of the plurality of matched guides to the new arrival event in a plurality determination processing sub-flow execution step S8100 in a second guide message matching sub-flow execution step S8000. Further, when there is no guide matched to the new arrival event by the matching using the second guide message, the guide assignment program 2600 determines that there is no guide to be assigned, and leaves the operator to determine the correctness by presenting all the candidate guides in step S11000.

The role of the matching processing using the unique keyword in steps S3000 to S6000 will be described. The guide assignment processing using the second guide message in consideration of a wildcard in steps S7000 to S9000 is the important portion of the present technology, but the second guide message is created by causing the monitoring operator to feed back the correct guide once as will be described later. Therefore, the wildcard of the candidate guide is not identified in step S7000 when the new event arrives at the initial stage of execution of the guide assignment program 2600, and thus, the processing proceeds to "No", and it is necessary to request the monitoring operator to give feedback almost every time.

In order to reduce this load, the matching processing of the guide using the unique keyword in steps S3000 to S6000 is performed before the matching processing using the second guide message is performed. If a new arrival event message includes a unique keyword that can uniquely identify a guide message from candidate guides, there is a possibility that the correct guide can be assigned even before the creation of the second guide message by identifying the guide to be assigned to the new arrival event using the new arrival event message, and the assignment processing can be smoothly performed. Since steps S3000 to S6000 in which the matching processing of the guide using the unique keyword is performed are processes for smoothly performing the assignment processing, the processing may proceed to step S7000 without being executed.

In step S3000, the guide assignment program 2600 calls the unique keyword extraction sub-flow, and extracts a unique keyword with respect to the candidate guide extracted in step S2000. Details of the unique keyword extraction sub-flow will be described later (see FIG. 8).

In step S4000, the guide assignment program 2600 calls the unique keyword matching processing sub-flow, and performs the matching processing with the event using the unique keyword extracted in step S3000. Details of the unique keyword matching processing sub-flow will be described later (see FIG. 9).

In step S5000, the guide assignment program 2600 determines whether there is only one assignment candidate guide matched using the unique keyword in step S4000. The guide assignment program 2600 refers to the guide ID 2210 of the assignment candidate guide matched to the new arrival event stored in step S4050 in a sub-flowchart of step S4000, and, if there is only one guide matched using the unique keyword, determines the guide as the guide to be assigned and proceeds to step S6000. On the other hand, when there are two or more guides matched using the unique keyword, or there is no guide matched using the unique keyword, the guide assignment program 2600 determines that the guide to be assigned to the new arrival event has not been narrowed down in the unique keyword matching processing, and proceeds to step S7000.

In step S6000, the guide assignment program 2600 stores "Y" in the assignment flag 2440 with the unique keyword of the guide determined to be assigned to the new arrival event in step S5000.

Steps S7000 to S9000 are processes for performing matching using the second guide message. Among the candidate guides extracted in step S1000, the guide assignment in consideration of the wildcard can be performed by determining whether the second guide message 2230 and the event message 2130 coincide regarding the guide having the second guide message. When the candidate guide does not have the second guide message 2230 and the wildcard is not identified, the matching using the second guide message is not performed.

In step S7000, the guide assignment program 2600 refers to the second guide message 2230 in the guide table 2200 for the candidate guide extracted in step S1000, and determines whether there is one or more guides in which the second guide message 2230 exists. When there is one or more guides in which the second guide message 2230 exists, the guide assignment program 2600 determines that the wildcard is processed and the matching using the second guide message can be performed, and proceeds to step S8000. Otherwise, the guide assignment program 2600 determines that the wildcard is not processed and it is difficult to perform the matching using the second guide message, and proceeds to step S11000.

In step S8000, the guide assignment program 2600 calls the second guide message matching sub-flow, and performs the matching processing with the second guide message.

Details of the second guide message matching sub-flow will be described later (see FIG. 10).

In step S9000, the guide assignment program 2600 refers to the assignment flag 2450 with the second guide message in the assignment result table 2400, and determines whether there is a guide that has been assigned by the matching using the second guide message in step S8000 for the new arrival event. If there is a guide whose assignment flag 2450 with the second guide message is "Y", it is determined that there is a guide that has been assigned using the second guide message, and the processing proceeds to step S10000 regarding that the guide is the guide that has been assigned to the new arrival event. On the other hand, when there is no guide whose assignment flag 2450 with the second guide message is "Y", it is determined that there is no guide to be assigned, and the processing proceeds to step S11000.

In step S10000, the guide assignment program 2600 displays an occurrence event information screen 8000 and a guide assignment result screen 9000 on the display 5000. The guide assignment result screen 9000 displays the guide that has been assigned in step S6000 or step S8000 and a guide which is a candidate guide but has not been assigned together with a basis why the guide has been assigned. The guide assignment program 2600 receives the correctness of the assignment result from the guide assignment result screen 9000 as an input of feedback by the monitoring operator, stores the feedback in the feedback result 2470 in the assignment result table 2400, and ends the processing.

Step S11000 is a process in a case where it is difficult to perform the matching processing using the second guide message in step S7000 because candidate guides exist but the wildcard is not identified, or a case where it is determined in step S9000 that there is no guide to be assigned among the candidate guides. In step S11000, the guide assignment program 2600 displays a list of guides, which are candidate guides but have not been assigned on the display 5000, as a guide assignment result screen 12000, and proceeds to step S12000.

Step S12000 is a process in which the guide assignment program 2600 receives feedback of the correct guide from the monitoring operator when the guide to be assigned to the new arrival event is not selectable.

When the processing proceeds from step S11000 to step S12000, the guide assignment result screen 12000 is already displayed on the display 5000. In step S12000, the guide assignment program 2600 displays the occurrence event information screen 8000 indicating occurrence event information and a correct guide selection screen 13000 that receives an input of selection of a correct guide on the display 5000 in addition to the guide assignment result screen 12000, and receives feedback of the correct guide from the monitoring operator.

In a case where the guide assignment program 2600 determines in step S2000 that there is no guide to be assigned to a new arrival event, the occurrence event information screen 8000 indicating the occurrence event information, the guide assignment result screen 12000, and the correct guide selection screen 13000 that receives the input of selection of the correct guide are displayed on the display 5000, and the feedback of the correct guide is received from the monitoring operator similarly to the case of proceeding from step S11000 to step S12000. In this case, however, a candidate guide and unassigned guide list pane 12100 is not displayed, and only information that there is no candidate guide is displayed on the guide assignment result screen 12000.

In step S13000, the guide assignment program 2600 stores the feedback result of the monitoring operator and the assignment result of the guide assignment program 2600 in the assignment result table 2400.

In a case of proceeding from step S11000 to step S12000 and step S13000, the event ID 2410 of the new arrival event, the guide ID 2420 of the candidate guide, and the similarity score 2430 are already stored in step S1090. In this case, neither the assignment with the unique keyword nor the assignment with the second guide message is performed, and thus, the guide assignment program 2600 stores "N" in the assignment flag 2440 with the unique keyword, the assignment flag 2450 with the second guide message, and the notification necessity determination flag 2460, and stores the feedback result on the success or failure from the monitoring operator in the feedback result 2470.

In a case of proceeding from step S2000 to step S12000 and step S13000, only the event ID 2410 of the new arrival event is already stored in the assignment result table 2400. In this case, the guide assignment program 2600 stores the guide ID 2420 of the guide fed back as the correct guide from the monitoring operator in a row in which the event ID 2410 of the new arrival event, stores the "correct answer" in the feedback result 2470, and stores "n/a" in the other similarity score 2430, assignment flag 2440 with the unique keyword, assignment flag 2450 with the second guide message, and notification necessity determination flag 2460. When the storage in the assignment result table 2400 is completed, the guide assignment program 2600 completes the processing.

Figure 7:
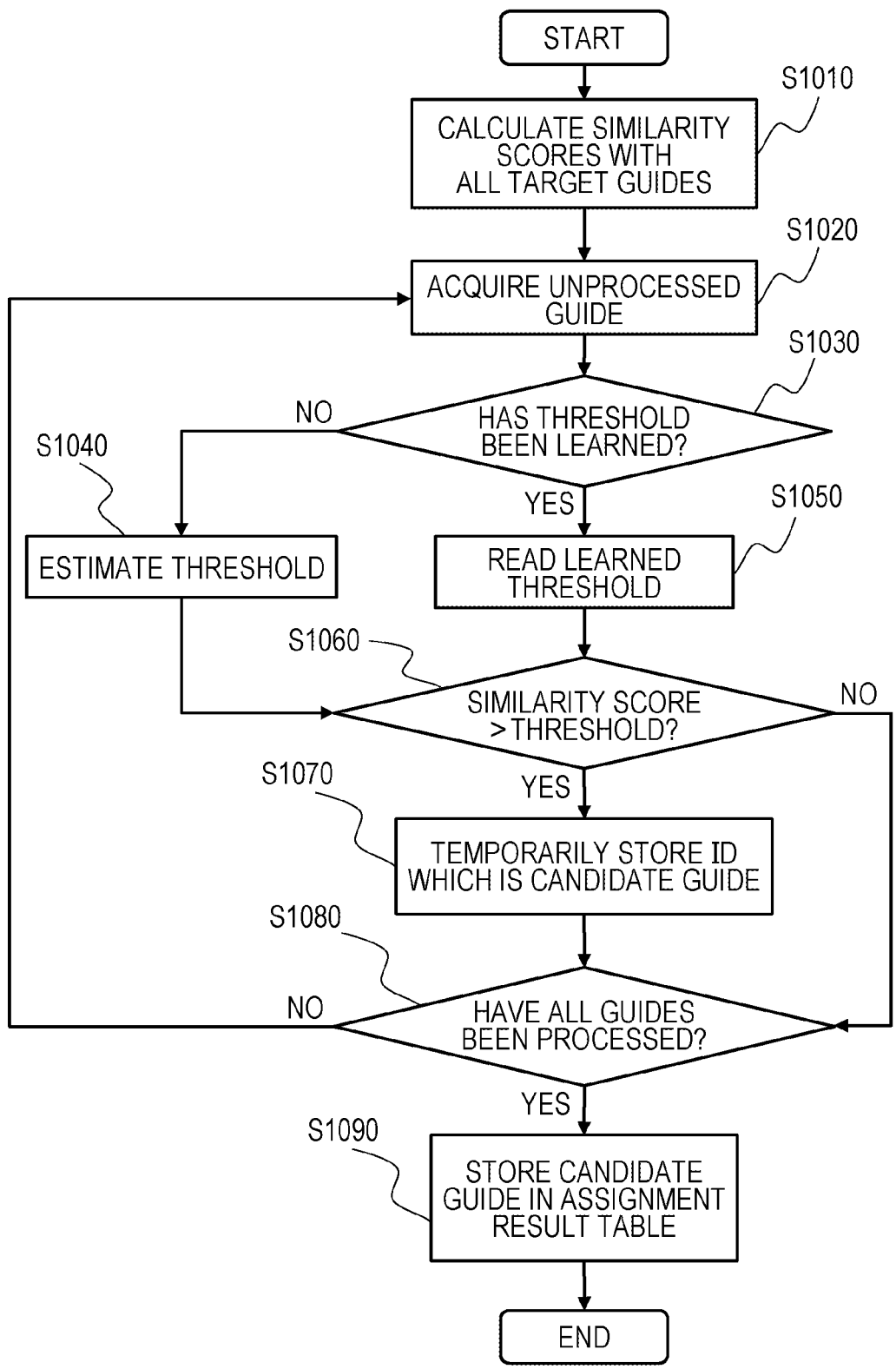
FIG. 7 is a sub-flowchart illustrating an example of a flow of candidate guide extraction processing for a new arrival event according to the first embodiment.

FIG. 7 is a sub-flowchart illustrating an example of a flow of candidate guide extraction processing for a new arrival event according to the first embodiment. This processing is executed by the guide assignment program 2600 in step S1000 in the flowchart illustrating the example of the flow of the guide assignment processing for the new arrival event.

In step S1010, the guide assignment program 2600 calculates a similarity score between an event message of the new arrival event and the guide messages 2220 of all guides included in the guide table 2200.

In step S1020, the guide assignment program 2600 selects one guide that has not yet been subjected to processes in steps S1030 to S1070 from among the guides in the guide table 2200 in ascending order of the guide ID 2210, for example.

In step S1030, the guide assignment program 2600 refers to the threshold 2250 of the guide table 2200 and determines whether the threshold of the guide has been learned. If a specific numerical value is stored in the threshold 2250, it is determined that the threshold has been learned, and the processing proceeds to step S1050. If the threshold 2250 is "n/a", it is determined that the threshold has not been learned, and the processing proceeds to step S1040.

In step S1040, the learning of the threshold of the guide is not completed, the guide assignment program 2600 estimates the threshold. As a threshold estimation method, for example, a regression device may be used as described in JP 2020-9154 A, or another method may be used.

In step S1050, the guide assignment program 2600 reads the learned threshold of the guide stored in the threshold 2250 of the guide table 2200.

In step S1060, the guide assignment program 2600 compares the similarity score calculated in step S1010 with the threshold estimated in step S1040 or read in step S1050. If the similarity score is equal to or more than the threshold, the guide assignment program 2600 determines the guide as a candidate guide and proceeds to step S1070. Otherwise, the guide assignment program 2600 determines that the guide is not a candidate guide and proceeds to step S1080.

In step S1070, the guide assignment program 2600 temporarily stores the guide ID 2210 of the guide selected as the candidate guide in step S1060, and proceeds to step S1080.

In step S1080, the guide assignment program 2600 checks whether a series of processes has been completed for all guides, and returns to step S1020 if the series of processes has not been completed. If the series of processes has been completed for all the guides, the guide assignment program 2600 proceeds to step S1090.

In step S1090, the guide assignment program 2600 stores the new arrival event and information of the candidate guide temporarily stored in step S1070 in the assignment result table 2400, and ends the processing.

When there is one or more candidate guides in the processes of steps S1010 to S1080, the event ID 2110 of the new arrival event is stored in the event ID 2410 of the assignment result table 2400, the guide ID 2210 of the candidate guide temporarily stored in step S1070 is stored in the guide ID 2420, and the similarity score between the new arrival event and the guide calculated in step S1010 is stored in the similarity score 2430. The fields of the assignment flag 2440 with the unique keyword, the assignment flag 2450 with the second guide message, the notification necessity determination flag 2460, and the feedback result 2470 are determined in the subsequent processing, and thus, stores "n/a" or are made blank at the present stage.

On the other hand, when there is no candidate guide in the processes of steps S1010 to S1080, the event ID 2110 of the new arrival event is stored in the event ID 2410 of the assignment result table 2400, and the other fields store "n/a" or are made blank.

Figure 8:
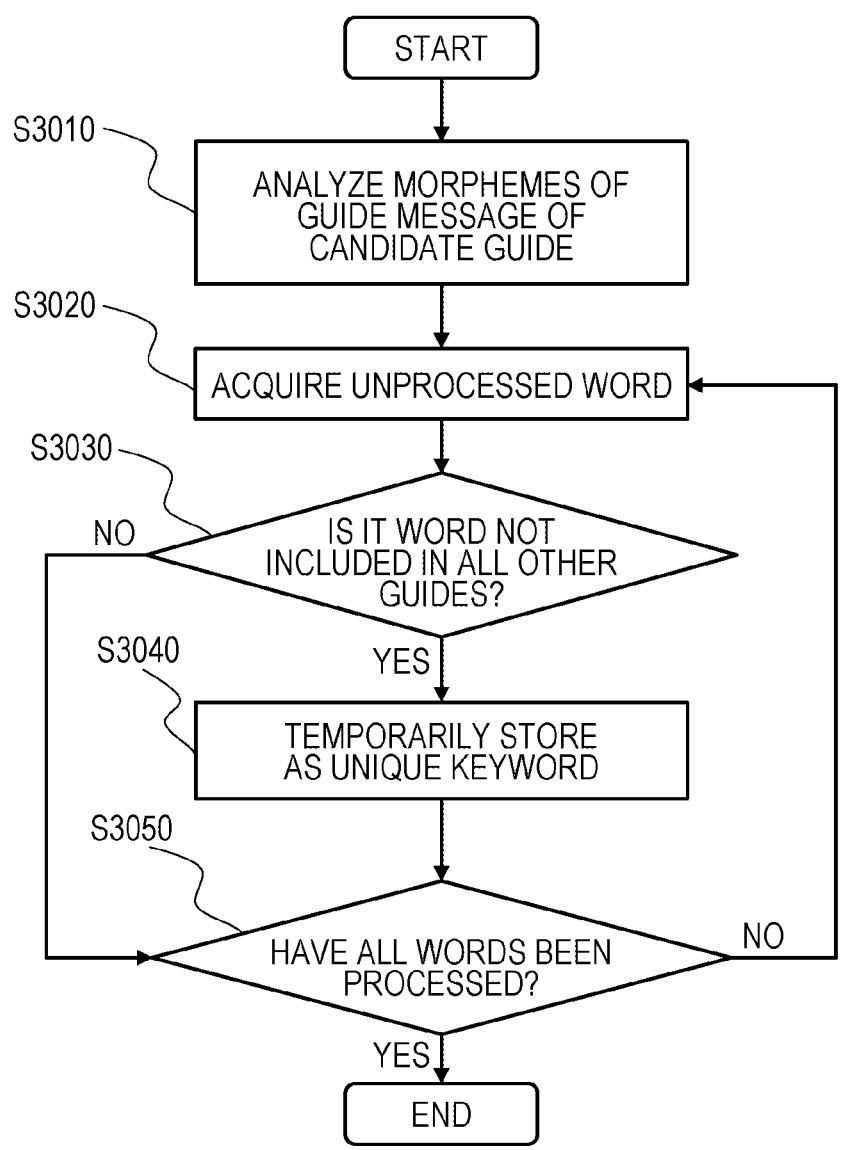
FIG. 8 is a sub-flowchart illustrating an example of a flow of unique keyword extraction processing for a candidate guide according to the first embodiment.

FIG. 8 is a sub-flowchart illustrating an example of a flow of unique keyword extraction processing for the candidate guide extracted in step S1000 according to the first embodiment. This processing is executed by the guide assignment program 2600 in step S3000 in the flowchart illustrating the example of the flow of the guide assignment processing for the new arrival event.

In step S3010, the guide assignment program 2600 refers to the assignment result table 2400, performs morphological analysis on guide messages of all candidate guides extracted in step S1000, and decomposes each guide message into words.

In step S3020, the guide assignment program 2600 selects one word that has not been subjected to processes in steps S3030 to S3040 and has been obtained by the morphological analysis in step S3010 in an appropriate order.

In step S3030, the guide assignment program 2600 determines whether the word is included in at least one of guide messages of all candidate guides other than its own guide message. If the word is a word that is not included in any guide message of all the other candidate guides, the guide assignment program 2600 determines that the word is a unique keyword that can identify the guide message among the candidate guides, and proceeds to step S3040. Otherwise, the guide assignment program 2600 determines that the word is not the unique keyword, and proceeds to step S3050.

In step S3040, the guide assignment program 2600 temporarily stores the unique keyword determined as the unique keyword in step S3030 together with the guide ID 2210 of the guide having the unique keyword. The temporarily stored unique keyword and the guide ID 2210 are used in the unique keyword matching processing sub-flow execution step S4000.

In step S3050, the guide assignment program 2600 checks whether a series of processes has been completed for all words created in step S3010, and returns to step S3020 if the series of processes has not been completed. When the series of processes has been completed for all the words, the guide assignment program 2600 ends the processing.

Figure 9:
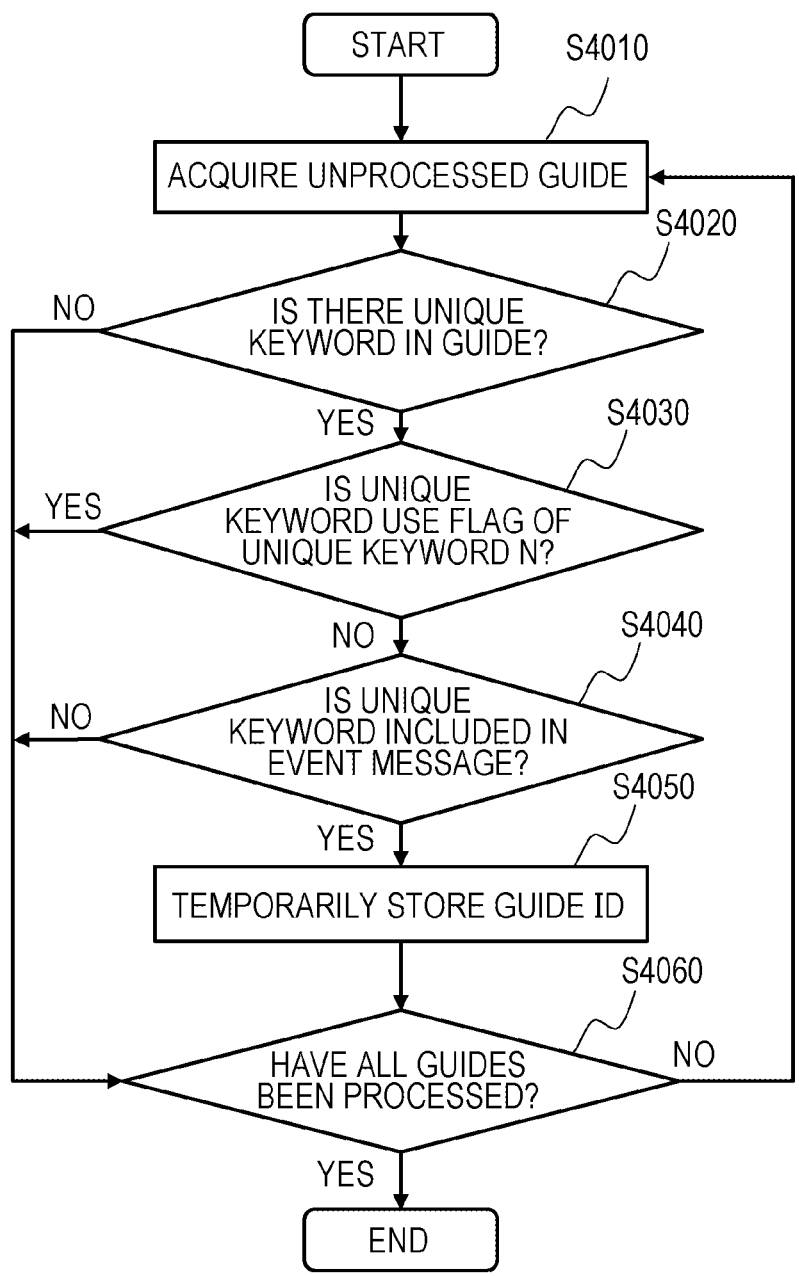
FIG. 9 is a sub-flowchart illustrating an example of a flow of matching processing using a unique keyword according to the first embodiment.

FIG. 9 is a sub-flowchart illustrating an example of a flow of the matching processing using the unique keyword according to the first embodiment. This processing is executed by the guide assignment program 2600 in step S4000 in the flowchart illustrating the example of the flow of the guide assignment processing for the new arrival event.

In step S4010, the guide assignment program 2600 refers to the assignment result table 2400 and selects one guide that has not yet been subjected to processes in steps S4020 to S4040 from among all the candidate guides extracted in step S1000 in an appropriate order.

In step S4020, the guide assignment program 2600 refers to the unique keyword temporarily stored in step S3040 and the guide ID 2210 of the guide having the unique keyword in the sub-flowchart illustrating the example of the flow of the unique keyword extraction processing, and determines whether the guide selected in step S4010 (hereinafter, will be described as the corresponding guide in the description of FIG. 9) has a unique keyword. The guide assignment program 2600 proceeds to step S4030 if the corresponding guide has the unique keyword (hereinafter, will be described as the corresponding unique keyword in the description of FIG. 9), and proceeds to step S4060 if not.

In step S4030, the guide assignment program 2600 refers to the unique keyword table 2300 and acquires information of a row in which the corresponding guide and the guide ID 2310 coincide. Then, the guide assignment program 2600 refers to the unique keyword use flag 2330 of a row having the unique keyword 2320 coinciding with the corresponding unique keyword, and determines whether the unique keyword use flag 2330 is "N". If the unique keyword use flag 2330 is "N", the guide assignment program 2600 determines not to perform assignment processing with a new arrival event using the corresponding unique keyword, and proceeds to step S4060. When the unique keyword use flag 2330 is not "N", that is, when the unique keyword use flag 2330 is "Y" or the corresponding unique keyword having the guide ID 2310 of the corresponding guide is not registered in the unique keyword table 2300, the guide assignment program 2600 proceeds to step S4040 to perform the assignment processing with the new arrival event using the corresponding unique keyword.

In step S4040, the guide assignment program 2600 determines whether the corresponding unique keyword is included in an event message of the new arrival event. The processing proceeds to step S4050 if the corresponding unique keyword is included in the event message of the new arrival event, and proceeds to step S4060 if not.

In step S4050, the guide assignment program 2600 temporarily stores the guide ID 2210 of the corresponding guide regarding the corresponding guide as a candidate to be assigned to the new arrival event. The stored guide ID 2210 is used in step S5000 in the flowchart illustrating the example of the flow of guide assignment processing for the new arrival event.

In step S4060, the guide assignment program 2600 checks whether a series of processes has been completed for all candidate guides, and returns to step S4010 if the series of processes has not been completed. When the series of processes has been completed for all the words, the guide assignment program 2600 ends the processing.

Figure 10:
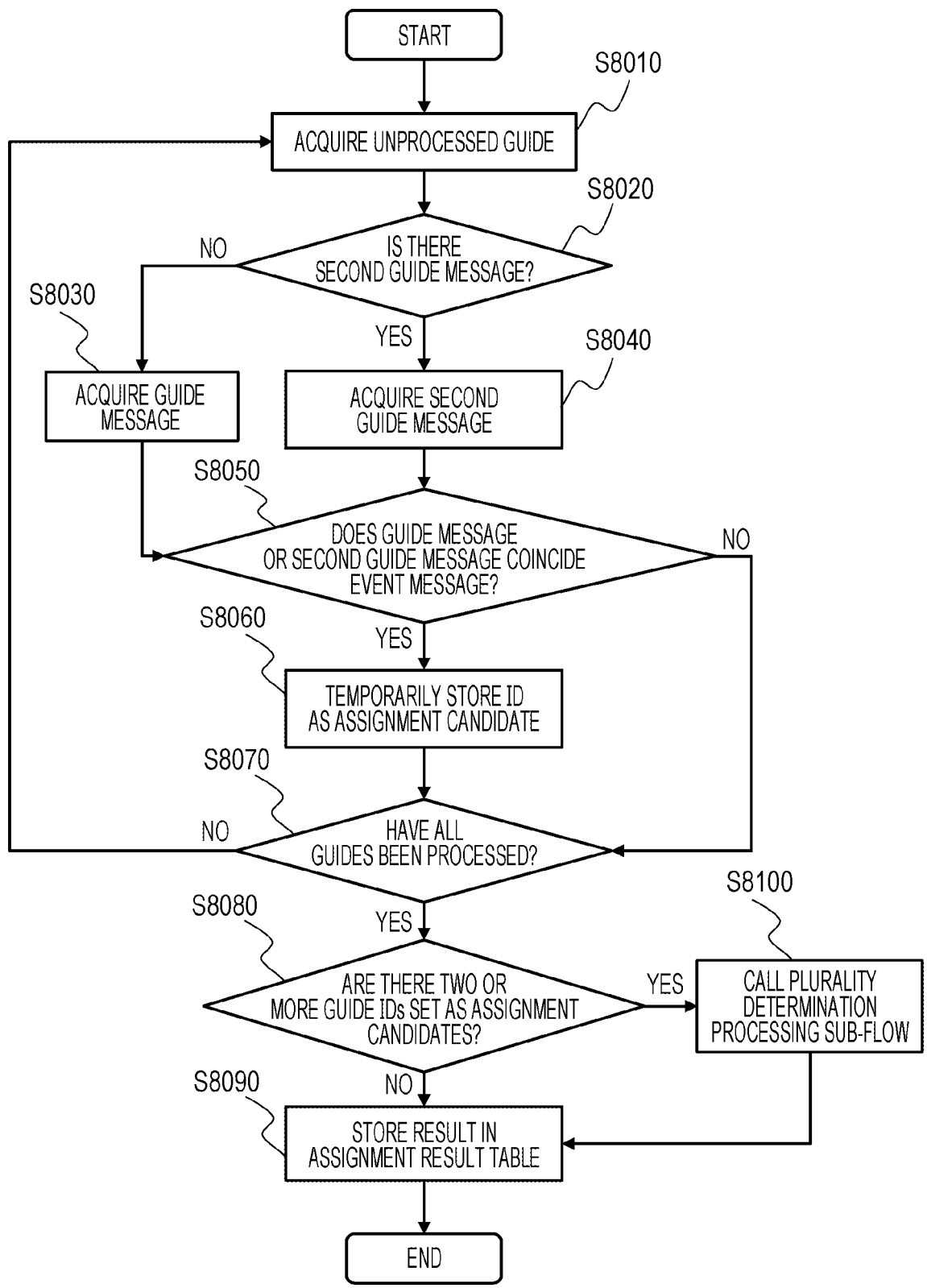
FIG. 10 is a sub-flowchart illustrating an example of a flow of assignment processing using a second guide message according to the first embodiment.

FIG. 10 is a sub-flowchart illustrating an example of a flow of the assignment processing using the second guide message according to the first embodiment. This processing is executed by the guide assignment program 2600 in step S8000 in the flowchart illustrating the example of the flow of the guide assignment processing for the new arrival event.

In step S8010, the guide assignment program 2600 refers to the assignment result table 2400 and selects one guide that has not yet been subjected to processes in steps S8020 to S8060 (hereinafter, will be described as the corresponding guide in the description of FIG. 10) from among all the candidate guides extracted in step S1000 in an appropriate order.

In step S8020, the guide assignment program 2600 refers to the second guide message 2230 in the guide table 2200, and determines whether the second guide message 2230 exists in the corresponding guide. If the second guide message 2230 exists, that is, when a specific character string is stored in the second guide message 2230, the guide assignment program 2600 determines that a wildcard of the corresponding guide has been identified, and proceeds to step S8040. If the second guide message 2230 does not exist, that is, when the second guide message stores "n/a" without storing the specific character string, the guide assignment program 2600 determines that the wildcard of the corresponding guide has not been identified, and proceeds to step S8030.

In step S8030, the guide assignment program 2600 refers to and acquires the guide message 2220 in the guide table 2200.

In step S8040, the guide assignment program 2600 refers to and acquires the second guide message 2230 in the guide table 2200.

In step S8050, the guide assignment program 2600 compares the guide message 2220 acquired in step S8030 or the second guide message 2230 acquired in step S8040 with a character string of the event message of the new arrival event, and determines whether the both exactly coincide except for the wildcard portion. Regarding such character string comparison, for example, character string comparison in a regular expression may be performed if the wildcard portion of the second guide message 2230 is written in the regular expression, or another method may be used.

For example, it may be determined that the second guide message coincides with the event message of the new arrival event in a case where a portion other than the wildcard portion of the second guide message coincides with a portion other than a portion, which corresponds to the wildcard, of the event message of the new arrival event (in other words, in a case where a portion other than a variable portion of the guide message coincides with a portion other than a portion corresponding to the variable portion in the event message). At this time, if the wildcard range 2240 of the second guide message has been designated, it may be determined that the second guide message coincides with the event message of the new arrival event in a case where the portion other than the wildcard portion of the second guide message coincides with the portion other than the portion, which corresponds to the wildcard, of the event message of the new arrival event and the portion, which corresponds to the wildcard, of the event message of the new arrival event falls within a range designated by the wildcard range 2240 of the second guide message.

The guide assignment program 2600 determines that the corresponding guide is an assignment candidate guide, and proceeds to step S8060 if the guide message 2220 acquired in step S8030 or the second guide message 2230 acquired in step S8040 coincides with the character string of the event message of the new arrival event, and proceeds to step S8070 if not.

In step S8060, the guide assignment program 2600 temporarily stores the guide ID 2210 regarding that the corresponding guide is the candidate guide to be assigned to the new arrival event. The stored guide ID 2210 is used in the plurality determination processing sub-flow in steps S8080 and S8100.

In step S8070, the guide assignment program 2600 checks whether a series of processes has been completed for all candidate guides, and returns to step S8010 if the series of processes has not been completed. If the series of processes has been completed for all the candidate guides, the guide assignment program 2600 proceeds to step S8080.

In step S8080, the guide assignment program 2600 refers to the guide ID 2210 of the guide stored as the assignment candidate in step S8060, and determines whether there are two or more guide IDs 2210 as the assignment candidates. The guide assignment program 2600 proceeds to step S8100 if there are two or more guide IDs 2210 as the assignment candidates, and the guide assignment program 2600 proceeds to step S8090 if not.

In step S8100, the guide assignment program 2600 calls the plurality determination processing sub-flow, and determines whether each of the plurality of assignment candidate guides extracted in step S8060 is to be finally assigned the new arrival event. Details of the plurality determination processing sub-flow will be described later (see FIG. 11).

In step S8090, the guide assignment program 2600 determines the candidate guide uniquely narrowed in step S8080 or the candidate guide remaining as the assignment candidate in step S8100 as the guide to be assigned to the new arrival event, and stores the result in the assignment result table 2400. The guide assignment program 2600 sets the assignment flag 2440 with the unique keyword of the guide determined as the guide to be assigned to the new arrival event to "N" and sets the assignment flag 2450 with the second guide message to "Y", and refers to the notification necessity determination rule 2270 of the guide table 2200 to set the notification necessity determination flag 2460 to "Y" if the notification necessity determination rule 2270 is satisfied and set the notification necessity determination flag 2460 to "N" if the notification necessity determination rule 2270 is not satisfied.

Figure 11:
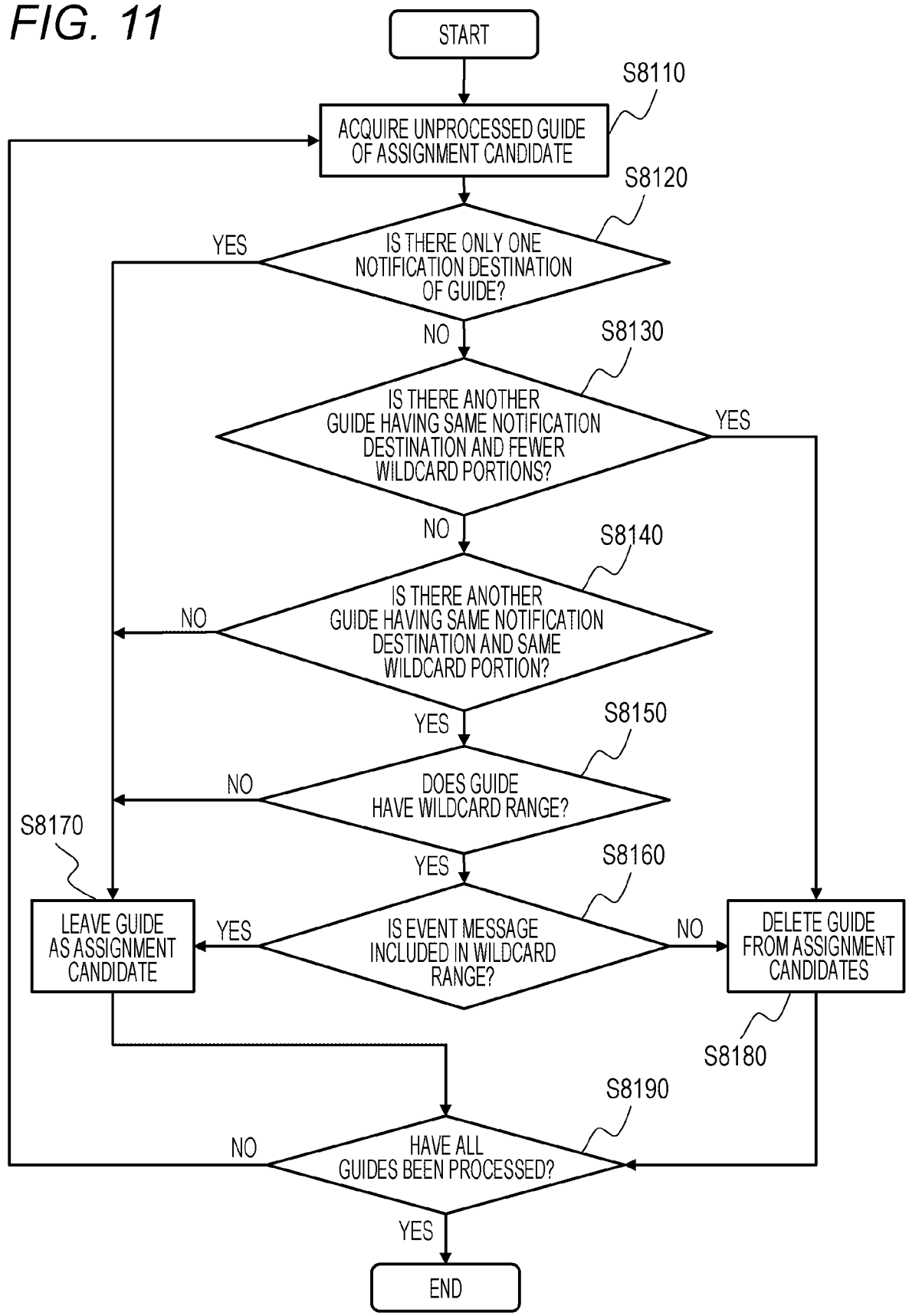
FIG. 11 is a sub-flowchart illustrating an example of a flow of plurality determination processing in a case where there are a plurality of guides which are assignment candidates of the matching processing using the second guide message in the first embodiment.

FIG. 11 is a sub-flowchart illustrating an example of a flow of the plurality determination processing in a case where there are a plurality of guides which are assignment candidates (that is, matched) by the matching processing using the second guide message in the first embodiment. This processing is performed in a case where there are a plurality of guides matched to the new arrival event even after performing the matching processing using the second guide message in order to determine whether such guides are to be finally assigned to the new arrival event.

The plurality of guides matched to the new arrival event by the matching using the second guide message mean that the plurality of guides have substantially the same guide message 2220 or second guide message 2230. However, there is a case where it is necessary to assign the plurality of guides depending on a situation or a case where only one guide needs to be assigned although the plurality of guides are matched in the matching processing using the second guide message, so that the determination is required.

For example, there is a case where an escalation is required for a plurality of different notification destinations regarding a certain event. In this case, there are a plurality of guides having exactly the same guide message 2220 although the notification destinations 2280 are different. In such a situation, it is necessary to assign the plurality of guides and perform a plurality of escalations for the event. This processing is executed by the guide assignment program 2600 in step S8100 in the sub-flowchart illustrating the example of the flow of the assignment processing using the second guide message.

In step S8110, the guide assignment program 2600 refers to the guide ID 2210 of the guide temporarily stored as the guide of the assignment candidate in step S8060 in the sub-flowchart illustrating the example of the flow of the assignment processing using the second guide message, and selects one guide that has not yet been subjected to processes in steps S8120 to S8180 (hereinafter, will be referred to as the corresponding guide in the description of FIG. 11) in an appropriate order.

In step S8120, the guide assignment program 2600 refers to the notification destination 2280 in the guide table 2200, and confirms whether there is a guide having the same notification destination 2280 among the other guides temporarily stored as the guides of the assignment candidates in step S8060 in the sub-flowchart illustrating the example of the flow of the assignment processing using the second guide message. As described in the above example, the plurality of escalations are requested when the notification destinations 2280 are different even if the same guide message 2220 is held. Therefore, if there is no other guide having the same notification destination 2280, the guide assignment program 2600 determines that the corresponding guide is the guide to be assigned to the new arrival event, and proceeds to step S8170.

In step S8130, the guide assignment program 2600 refers to the second guide message 2230 in the guide table 2200 of another guide having the same notification destination 2280, and determines whether there is the other guide having a few wildcard portions.

For example, it is assumed that an event in which the event message 2130 is "Job net (report generation) has abnormally ended" has arrived as a new arrival event. When the matching processing using the second guide message is performed for the event using the guides stored in the guide table 2200 of the example of FIG. 3, both the guide with the guide ID 2210 of "G2" and the guide with the guide ID of "G3" are matched. This is because the guide with the guide ID 2210 of "G2" has the second guide message 2230 identical to the event message 2130, the guide with the guide ID 2210 of "G3" has a wildcard portion of the second guide message 2230 coinciding with "report generation" of the event message, and the other portion is the same as that of the event message 2130.

In such a case, however, only the guide with the guide ID 2210 of "G2" whose specific content coincides is assigned, instead of assigning both the guides. That is, in a case where there is a guide in which a specific content is written in a wildcard portion, the guide is prioritized, and a guide written as the wildcard is not assigned. Therefore, in a case where there is another guide having a few wildcard portions, the guide assignment program 2600 regards that such a guide is the guide in which the specific content is written in the wildcard portion and determines not to assign the corresponding guide to the new arrival event, and proceeds to step S8180. Otherwise, the processing proceeds to step S8140.

In step S8140, the guide assignment program 2600 refers to the second guide message 2230 in the guide table 2200 of another guide having the same notification destination 2280, and determines whether there is a guide having the same portion as a wildcard. In a case where there is the guide having the same portion as the wildcard, the determination based on the wildcard range 2240 is performed, and thus, the processing proceeds to step S8150. Otherwise, since there is only a guide having a large number of wildcards when considering the information of the determination in step S8130 together, the corresponding guide is determined as the guide to be assigned to the new arrival event, and the processing proceeds to step S8170.

In step S8150, a guide in which the notification destination 2280 and the wildcard portion are exactly the same as the corresponding guide exists in addition to the corresponding guide. That is, between the guides, the guide messages 2220 are the same as each other, and the second guide messages 2230 are the same as each other. In this case, there is a high possibility that the determination based on the wildcard range 2240 is necessary. The guide assignment program 2600 determines whether the corresponding guide has the wildcard range 2240 in order to perform the determination of assignment based on the wildcard range 2240. The guide assignment program 2600 refers to the wildcard range 2240, proceeds to step S8160 if a specific value is stored in the wildcard range 2240 in the guide table 2200, and determines that the corresponding guide is the guide to be assigned to the new arrival event and proceeds to step S8170 if the wildcard range 2240 is "n/a".

In step S8160, the guide assignment program refers to the wildcard range 2240 in the guide table 2200, and determines whether the event message of the new arrival event is included in the wildcard range 2240 of the corresponding guide. For example, it is assumed that an event message "Request from host (111.111.111.10) has been ignored" has arrived as the event message of the new arrival event. If the assignment is performed with the guides in the example of FIG. 3, the guide with the guide ID 2210 of "G4" has the wildcard range 2240 of an IP address having 0 to 100 at the end, and thus, the event message of the new arrival event is included in the wildcard range. The guide assignment program determines that the corresponding guide is the guide to be assigned to the new arrival event and proceeds to step S8170 if the event message of the new arrival event falls within the wildcard range, and determines that the corresponding guide is not assigned to the new arrival event and proceeds to step S8180 if not.

In step S8170, the guide assignment program 2600 determines that the corresponding guide is the guide to be assigned to the new arrival event, and proceeds to step S8190.

In step S8180, the guide assignment program 2600 determines that the corresponding guide is a guide that is not to be assigned to the new arrival event, deletes the corresponding guide from the assignment candidates, and proceeds to step S8190.

In step S8190, the guide assignment program 2600 checks whether a series of processes has been completed for all guides as assignment candidates, and returns to step S8110 if the series of processes has not been completed. If the series of processes has been completed for all the guides as the assignment candidates, the guide assignment program 2600 completes the processing.

Figure 12:
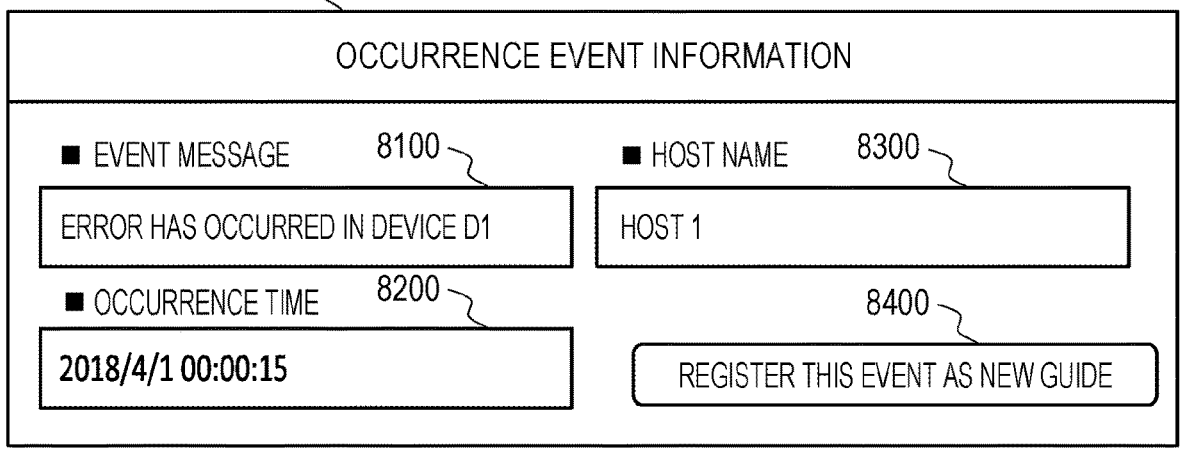
FIG. 12 is a view illustrating an example of a screen displaying event information of a new arrival event in the first embodiment.

FIG. 12 is a view illustrating an example of a screen displaying event information of a new arrival event in the first embodiment. The guide assignment program 2600 acquires data of a new arrival event from the event table 2100. The occurrence event information screen 8000 including an event message 8100, an occurrence time 8200, and a host name 8300 of the new arrival event is displayed in the example of FIG. 12. Other data may be displayed in accordance with the data of the event table although not displayed herein.

On the occurrence event information screen 8000, "Register this event as new guide" is displayed as a new guide registration button 8400. For example, the monitoring operator refers to the guide assignment result screen 9000 or the correct guide selection screen 13000, which will be described later, and clicks this new guide registration button with a mouse in a case where a guide to be assigned to the new arrival event is not present in the existing guide list. When this button is pressed, a new guide registration screen 11000, which will be described later, appears, and a new guide can be registered based on an event message of the event.

Figure 13:
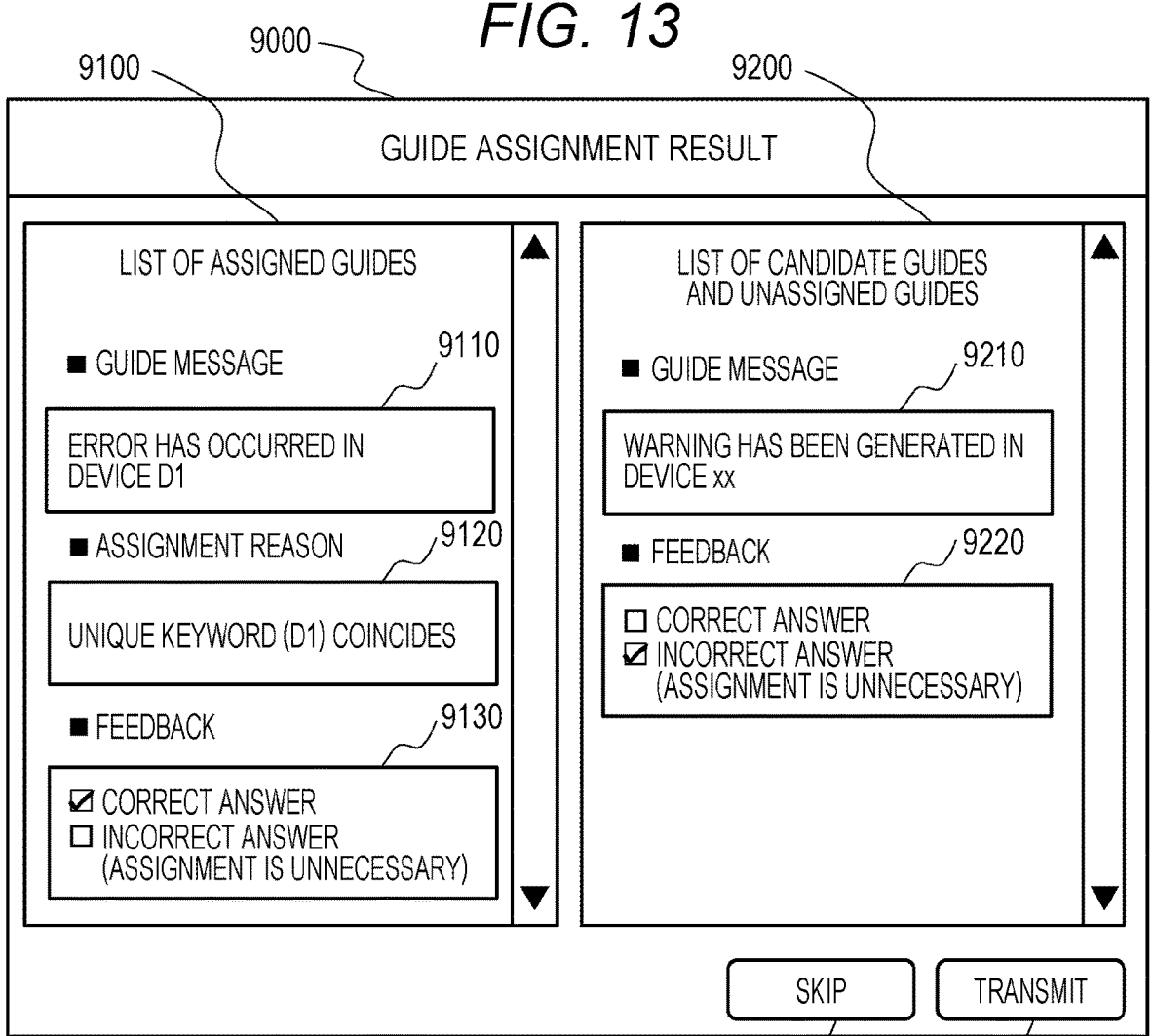
FIG. 13 is a view illustrating an example of a screen displaying a guide assignment result in a case where a guide is assigned for a new arrival event in the first embodiment.

FIG. 13 is a view illustrating an example of a screen displaying a guide assignment result in step S10000 in a case where a guide is assigned to the new arrival event in step S5000 or step S9000 in the first embodiment. In the example of FIG. 13, the guide assignment result screen 9000 includes two panes which are an assigned guide list pane 9100 and a candidate guide and unassigned guide list pane 9200

The assigned guide list pane 9100 is a pane that displays information of a guide assigned by the guide assignment program 2600 for the new arrival event and a basis of the assignment, and receives feedback for the information and the basis. The guide assignment program 2600 refers to the assignment result table 2400 and acquires data of a guide in which the assignment flag 2440 with the unique keyword or the assignment flag 2450 with the second guide message is "Y" (hereinafter, will be referred to as the corresponding guide in the description of FIG. 13).

The guide assignment program 2600 acquires the guide message 2220 of the corresponding guide from the guide table 2200 based on the guide ID 2420 of the corresponding guide, and displays the guide message on a guide message display section 9110. Although not illustrated, the guide assignment program 2600 may display the other information of the guide table, for example, information, such as the notification destination 2280, in the assigned guide list pane 9100.

Further, the guide assignment program 2600 refers to the assignment flag 2440 with the unique keyword and the assignment flag 2450 with the second guide message of the corresponding guide, and displays the basis of the assignment in an assignment reason display section 9120. The example of FIG. 13 illustrates an example in a case where the assignment flag 2440 with the unique keyword is "Y", and for example, a message indicating that the corresponding guide has been assigned since the unique keyword of "D1" coincides with the event message is displayed. In a case where the assignment flag 2450 with the second guide message is "Y", a message indicating that the corresponding guide has been assigned since the second guide message coincides with the event message is displayed although not illustrated.

The guide assignment program 2600 further displays a guide-specific feedback input form 9130 on the assigned guide list pane 9100. The monitoring operator views the information of the corresponding guide displayed in the assigned guide list pane 9100, and selects a "correct answer" of the feedback input form 9130 if it is correct to assign the corresponding guide to the new arrival event, and selects an "incorrect answer (assignment is unnecessary)" if the assignment is incorrect. FIG. 13 illustrates an example in which the monitoring operator selects the "correct answer". In this case, for example, the monitoring operator operates a check box corresponding to the "correct answer" so that the selection result of the monitoring operator is input.

In FIG. 13, if there are a plurality of guides assigned to the new arrival event, the guide assignment program 2600 can display information thereof in the assigned guide list pane 9100 in a scrollable manner. The candidate guide and unassigned guide list pane 9200 is a pane in which the guide assignment program 2600 displays information of a guide, which is a candidate guide but is not assigned for the new arrival event, and receives feedback for the information. The guide assignment program 2600 refers to the assignment result table 2400 and acquires data of a guide in which both the assignment flag 2440 with the unique keyword and the assignment flag 2450 with the second guide message are "N".

A format of the information displayed in the candidate guide and unassigned guide list pane 9200 is basically similar to a format of the information displayed in the assigned guide list pane 9100 except for the assignment reason display section 9120. In the assigned guide list pane 9100, a reason why a guide has been assigned is displayed on the assignment reason display section 9120. In the candidate guide and unassigned guide list pane 9200, however, a reason why a guide has not been assigned is not displayed to the monitoring operator. The monitoring operator views the information displayed in the candidate guide and unassigned guide list pane 9200, selects the "incorrect answer (assignment is not unnecessary)" if the corresponding guide is not assigned to the new arrival event, and selects the "correct answer" if the corresponding guide is assigned to the new arrival event.

In FIG. 13, when there are a plurality of candidate guides and unassigned guides, the guide assignment program 2600 can display information thereof in the candidate guide and unassigned guide list pane 9200 in a scrollable manner.

The monitoring operator selects a transmit button 9400 when finishing the selection of the feedback input form 9130 of the assigned guide list pane 9100 and a feedback input form 9220 of the candidate guide and unassigned guide list pane 9200.

As described above, the guide assignment program 2600 acquires feedback from the monitoring operator as to whether the assignment result is "correct" or "incorrect" for each of the guides assigned to the new arrival event using the assigned guide list pane 9100. Further, the guide assignment program 2600 acquires feedback from the monitoring operator as to whether the assignment result is "correct" or "incorrect" for each of the guides, which are the candidate guides but have not been assigned to the new arrival event, using the candidate guide and unassigned guide list pane 9200.

Further, the monitoring operator can view the information of the assigned guide list pane 9100 and the candidate guide and unassigned guide list pane 9200 displayed on the guide assignment result screen 9000 and skip feedback processing if there is no problem in the assignment result. In this case, the monitoring operator selects a skip button 9300 without selecting the feedback input form 9130 of the assigned guide list pane 9100 and the feedback input form 9220 of the candidate guide and unassigned guide list pane 9200. As a result, the monitoring operator does not need to perform feedback selection for each new arrival event, and can smoothly perform event processing.

When the skip button 9300 or the transmit button 9400 is selected, the guide assignment program 2600 starts the feedback processing in the case the assigned guide exists, and displays the guide assignment result screen 10000 to the superior administrator to notify the guide assignment result by the guide assignment program 2600 and the information of the guide finally selected by the operator.

Figure 14:
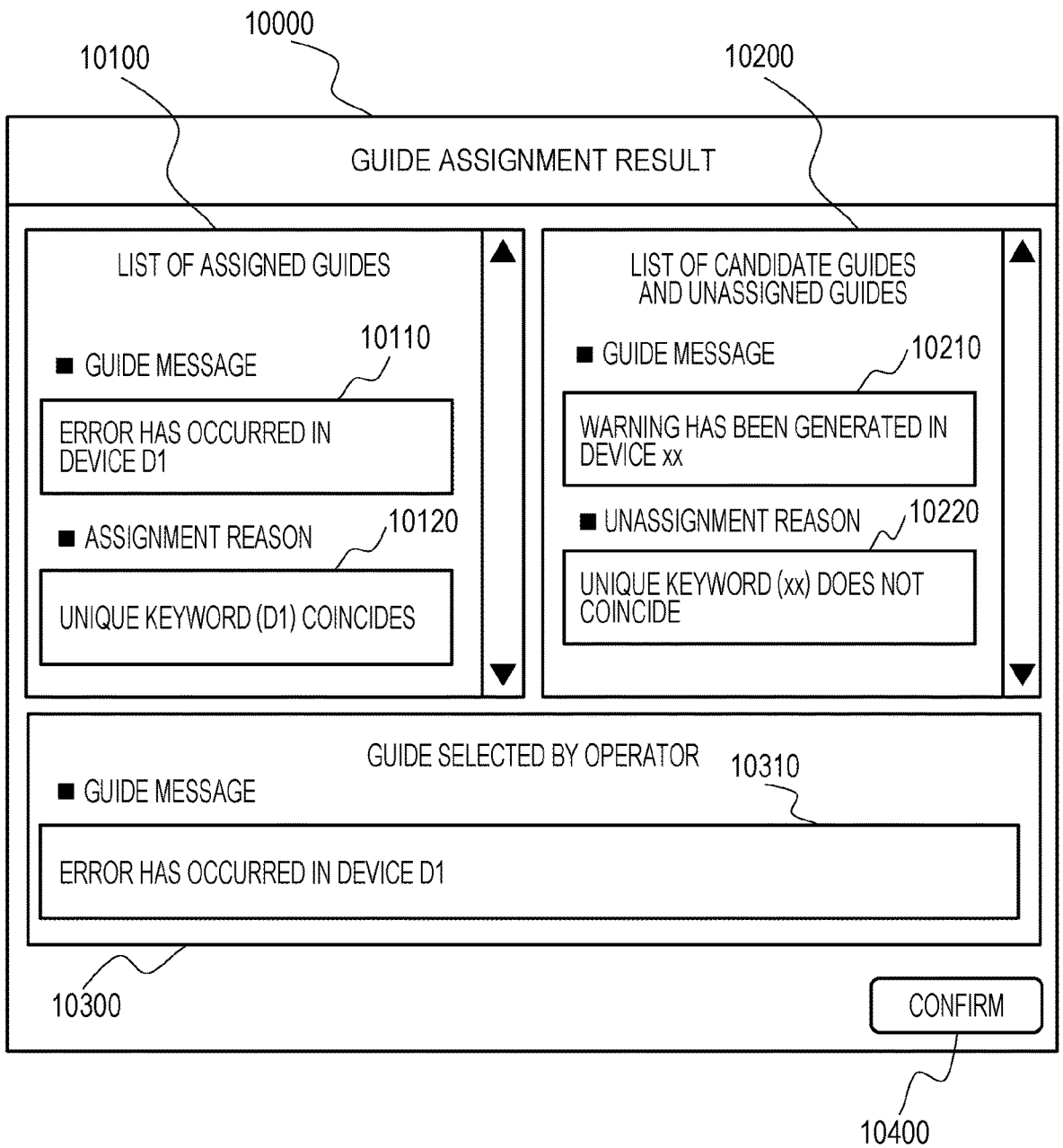
FIG. 14 is a view illustrating an example of a screen of a guide assignment result displayed to a superior administrator in a case where a monitoring operator transmits feedback regarding an assignment result from the guide assignment result screen in the first embodiment.

FIG. 14 is a view illustrating an example of a screen of the guide assignment result displayed to the superior administrator in the case where the monitoring operator transmits feedback regarding the assignment result from the guide assignment result screen 9000 in the first embodiment; The superior administrator can confirm information indicating whether there is no problem in the guide assignment by the guide assignment program 2600 and which guide the monitoring operator has selected as the correct guide by confirming the screen.

In the example of FIG. 14, the guide assignment result screen 10000 includes three panes which are an assigned guide list pane 10100, a candidate guide and unassigned guide list pane 10200, and a guide pane 10300 selected by the operator.

The assigned guide list pane 10100 is a pane that displays information of a guide assigned by the guide assignment program 2600 for the new arrival event and a basis of the assignment. Formats of the information displayed on a guide message display section 10110 and an assignment reason display section 10120 of the assigned guide list pane 10100 are similar to formats in the guide message display section 9110 and the assignment reason display section 9120 displayed in the assigned guide list pane 9100 of the guide assignment result screen 9000 displayed to the monitoring operator, respectively. Since the superior administrator only confirms the assignment result and does not perform feedback, the assigned guide list pane 10100 has no feedback input form.

In FIG. 14, if there are a plurality of assigned guides, the guide assignment program 2600 can display information thereof in the assigned guide list pane 10100 in a scrollable manner.

The candidate guide and unassigned guide list pane 10200 is a pane in which the guide assignment program 2600 displays information of a guide, which is a candidate guide but has not been assigned for the new arrival event, and a basis of unassignment.

A format of the information displayed on a guide message display section 10210 of the candidate guide and the unassigned guide list pane 10200 is similar to a format in a guide message display section 9210 displayed in the candidate guide and unassigned guide list pane 9200 of the guide assignment result screen 9000 displayed to the monitoring operator. Further, a reason why this guide has not been assigned to the new arrival event is displayed on an unassignment reason display section 10220. In a case where the assignment flag 2440 with the unique keyword of the assigned guide is "Y" and a reason displayed in the assignment reason display section 10120 of the assigned guide list pane 10100 is based on the unique keyword, a reason displayed in the unassignment reason display section 10220 of the candidate guide and unassigned guide list pane 10200 should be based on the unique keyword. On the other hand, in a case where the assignment flag 2450 with the second guide message is "Y" and a reason displayed in the assignment reason display section 10120 of the assigned guide list pane 10100 is based on the second guide message, a reason displayed in the unassignment reason display section 10220 of the candidate guide and unassigned guide list pane 10200 is also based on the second guide message.

The example of FIG. 14 illustrates an example in the case where the assignment flag 2440 with the unique keyword of the assigned guide is "Y" and the reason displayed in the assignment reason display section 10120 of the assigned guide list pane 10100 is based on the unique keyword, and a message indicating that a guide has not been assigned since the unique keyword "xx" of the unassigned guide does not coincide with the event message is displayed, for example.

In the case where the assignment flag 2450 with the second guide message of the assigned guide is "Y" and the reason displayed in the assignment reason display section 10120 of the assigned guide list pane 10100 is based on the second guide message, a message indicating that a guide has not been assigned since the second guide message of the unassigned guide does not coincide with the event message is displayed although not illustrated.

In FIG. 14, when there are a plurality of candidate guides and unassigned guides, the guide assignment program 2600 can display information thereof in the candidate guide and unassigned guide list pane 10200 in a scrollable manner.

The guide pane 10300 selected by the operator is a pane that displays information of the guide fed back as the "correct answer" on the guide assignment result screen 9000. A format of the information displayed on the guide message display section 10310 is similar to the format of the information displayed on the guide message display section 9110 or the guide message display section 9210 of the guide fed back as the correct guide. When the new arrival event has been registered, a guide message 11200 registered as the new arrival event may be displayed in this pane, or nothing may be displayed.

As described above, the superior administrator confirms the assignment result by the guide assignment program 2600 and the selection of the correct guide by the monitoring operator. When there is no problem in the assignment result, the superior administrator selects a confirm button 10400 and ends the screen. If an abnormality is confirmed in the assignment result, the superior administrator takes an appropriate countermeasure by modifying the guide or modifying the guide assignment program 2600.

Figure 15:
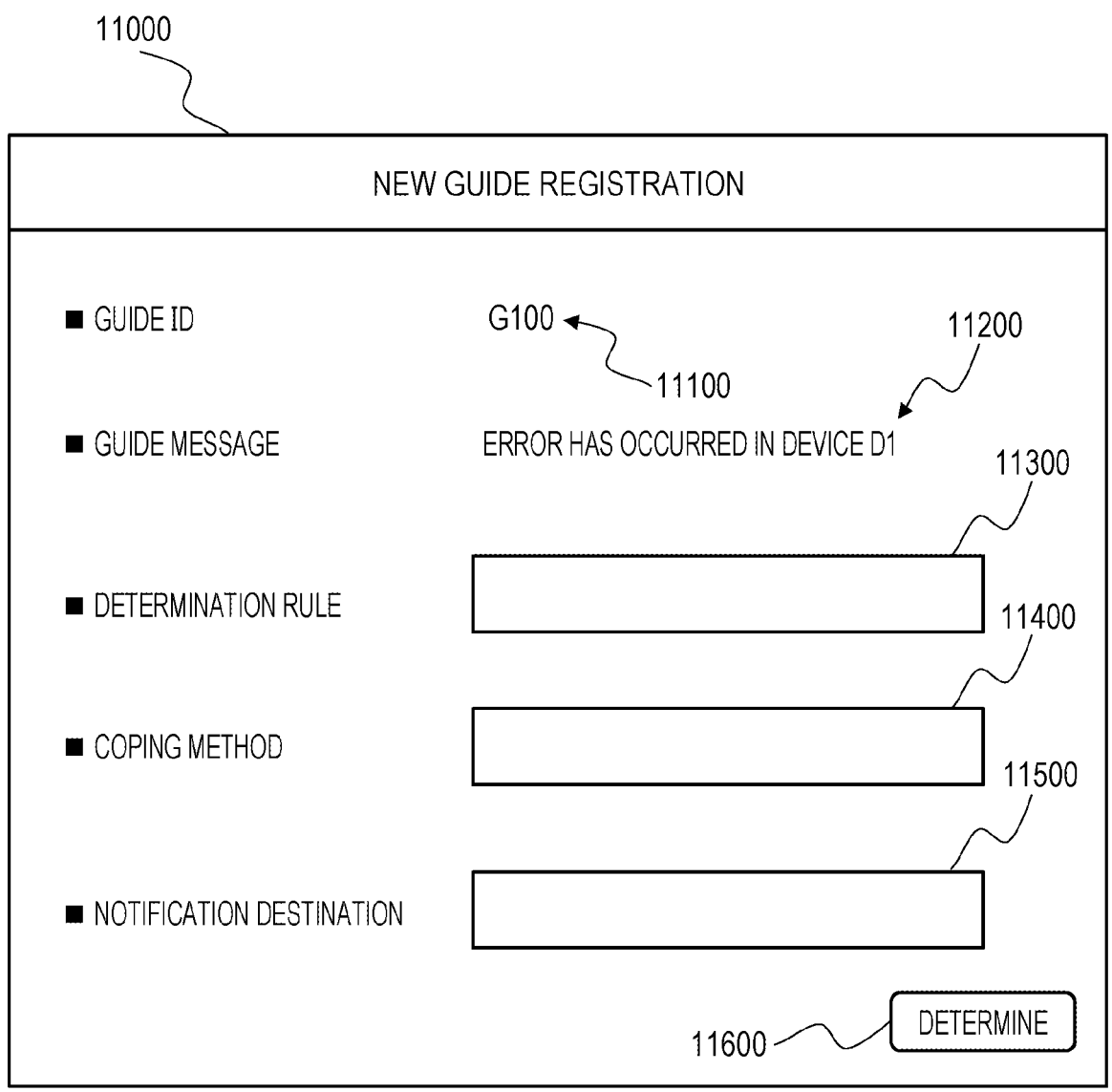
FIG. 15 is a view illustrating an example of a screen for registration of a new guide displayed in a case where a new guide registration button is selected on an occurrence event information screen in the first embodiment.

FIG. 15 is a view illustrating an example of a screen for registration of a new guide displayed in a case where the new guide registration button 8400 is selected on the occurrence event information screen 8000 in the first embodiment.

The guide assignment program 2600 refers to a guide table and displays a new guide ID that has not yet been assigned on a guide ID 11100 of the new guide registration screen 11000. Further, the guide assignment program 2600 receives information of an event message displayed in the event message 8100 on the occurrence event information screen 8000 and displays the information in the guide message 11200 on the new guide registration screen 11000. The guide ID 11100 and the guide message 11200 are automatically determined by the guide assignment program 2600 in FIG. 15, but may be appropriately edited by the monitoring operator.

The new guide registration screen 11000 includes a determination rule input form 11300, a coping method input form 11400, and a notification destination input form 11500, and prompts the monitoring operator to perform input. Although not illustrated, information included in the guide table 2200, such as the second guide message, can be input. The new guide is registered when the monitoring operator ends the input and selects a determination button 11600.

Figure 16A:
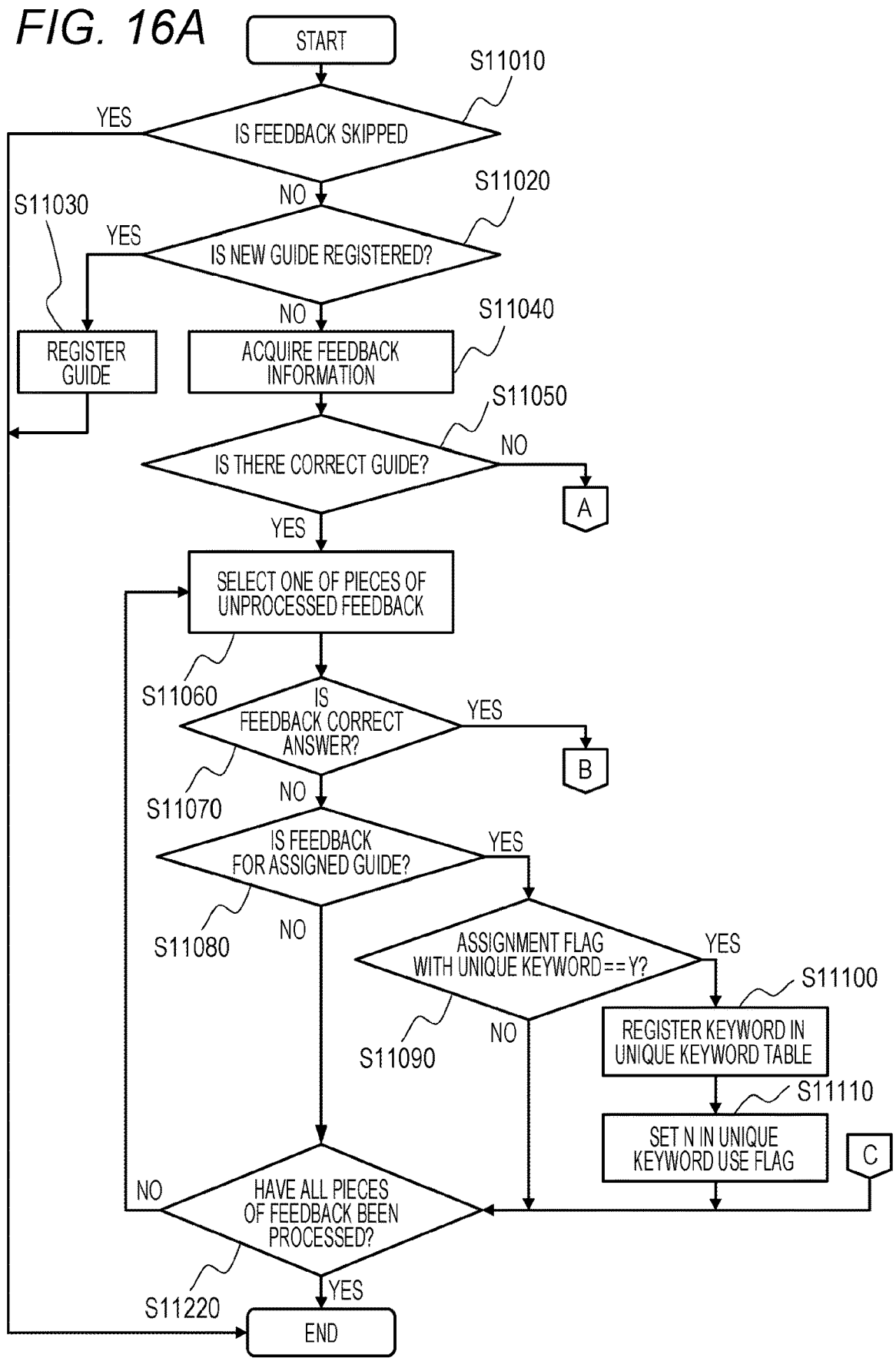
FIG. 16A is a flowchart illustrating an example of a flow of feedback processing with respect to a guide assignment result in a case where there is a guide assigned to a new arrival event in the first embodiment.
Figure 16B:
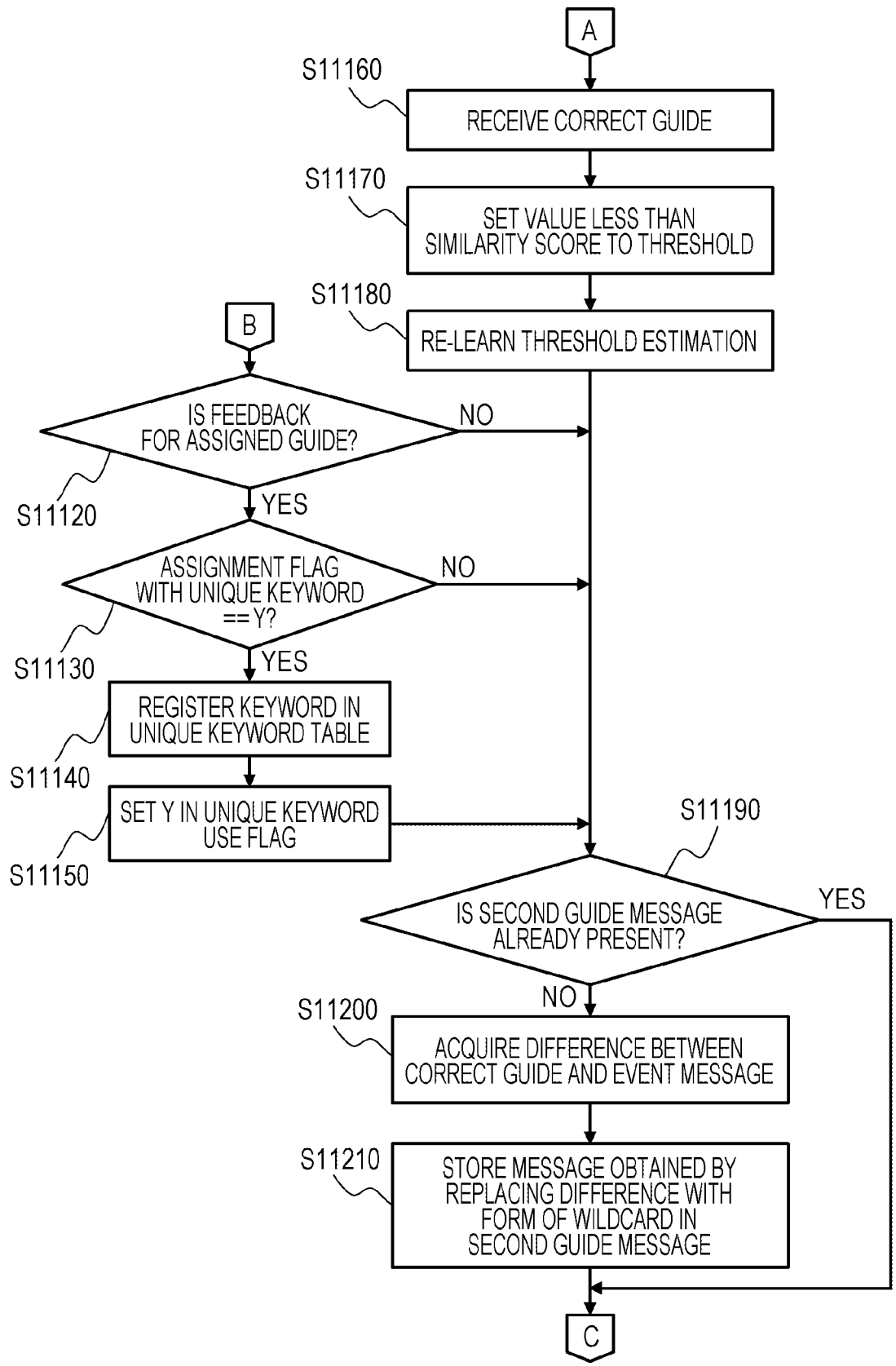
FIG. 16B is a flowchart illustrating an example of the flow of the feedback processing with respect to the guide assignment result in the case where there is the guide assigned to the new arrival event in the first embodiment.

FIGS. 16A and 16B are flowcharts illustrating an example of a flow of feedback processing with respect to a guide assignment result in a case where there is a guide assigned to a new arrival event in the first embodiment. This processing is executed by the guide assignment program 2600 as processing for feedback in a case where the monitoring operator inputs a new guide from the new guide registration screen 11000 and selects the determination button 11600 or in a case where the monitoring operator selects the skip button 9300 or inputs feedback information and selects the transmit button 9400 from the guide assignment result screen 9000.

In step S11010, the guide assignment program 2600 determines whether the skip button 9300 on the guide assignment result screen 9000 has been selected. If the skip button 9300 has been selected, the guide assignment program 2600 determines that it is unnecessary to perform the feedback processing, and ends the feedback processing. Otherwise, the guide assignment program 2600 proceeds to step S11020 to perform the feedback processing.

In step S11020, the guide assignment program 2600 determines whether the determination button 11600 on the new guide registration screen 11000 has been selected and new guide registration has been performed. The guide assignment program 2600 proceeds to step S11300 if the new guide registration has been performed, and proceeds to step S11400 if not.

In step S11030, the guide assignment program 2600 newly adds a row to the guide table 2200 and stores information of the guide input on the new guide registration screen 11000 in a field of each column of the row. For example, pieces of information input to the guide ID 11100, the guide message 11200, the determination rule input form 11300, the coping method input form 11400, and the notification destination input form 11500 in the example of FIG. 15 are stored respectively in the guide ID 2210, the guide message 2220, the notification necessity determination rule 2270, the coping method 2260, and the notification destination 2280 of the guide table 2200. Regarding information that has not been input, "n/a" is stored.

In step S11040, the guide assignment program 2600 acquires the information of feedback input to the guide assignment result screen 9000, and proceeds to step S11050.

In step S11050, the guide assignment program 2600 determines whether there is a guide fed back as a "correct answer" in the feedback information acquired in step S11040. If the guide fed back as the "correct answer" exists in the feedback information, the guide assignment program 2600 determines that the guide to be assigned is included in candidate guides, and proceeds to step S11060. Otherwise, the guide assignment program 2600 determines that the guide to be assigned is not included in the candidate guides, and proceeds to step S11160.

In step S11060, the guide assignment program 2600 selects one piece of unprocessed feedback information from the pieces of feedback information acquired in step S11040.

In step S11070, the guide assignment program 2600 determines whether the feedback selected in step S11060 is the "correct answer". If the feedback for the guide is the "correct answer" and the assignment is necessary, the guide assignment program 2600 proceeds to step S11120. If the feedback for the guide is an "incorrect answer" and the assignment is unnecessary, the guide assignment program 2600 proceeds to step S11080.

Steps S11080 to S11110 are processes in a case where feedback is the "incorrect answer". If feedback for a guide that has not been assigned by the guide assignment program 2600 is the "incorrect answer", it is considered that classification has been correctly performed, and thus, no processing is performed for the feedback. On the other hand, in a case where feedback for a guide that has been assigned by the guide assignment program 2600 with a certain unique keyword is the incorrect answer, the unique keyword use flag 2330 of the unique keyword is set to "N" such that the unique keyword is used and the same mistake is not made in the next assignment.

In step S11080, the guide assignment program 2600 determines whether the feedback selected in step S11060 is feedback for the guide assigned to the new arrival event. In the case of the feedback for the guide assigned to the new arrival event, the guide assignment program 2600 proceeds to step S11090. Otherwise, the guide assignment program 2600 determines that a guide unassigned to an event has been correctly classified, and proceeds to step S11220.

In step S11090, the guide assignment program 2600 refers to the assignment flag 2440 with the unique keyword in the assignment result table 2400 of the guide, and determines whether the unique keyword assignment flag 2440 is "Y". If the unique keyword assignment flag 2440 of the guide is "Y", the guide assignment program 2600 is to perform assignment using the unique keyword, but the "incorrect answer" is fed back then, and thus, the processing proceeds to step S11100 such that the unique keyword is not used. Otherwise, the processing proceeds to step S11200.

In step S11100, the guide assignment program 2600 registers the unique keyword in the unique keyword table 2300. The guide assignment program 2600 newly creates a row in the unique keyword table 2300, stores a guide ID and the unique keyword of the guide in the guide ID 2310 and the unique keyword 2320, respectively, and proceeds to step S11110.

In step S11110, the guide assignment program 2600 stores "N" in the unique keyword use flag 2330 of the row in which the guide ID 2310 and the unique keyword 2320 are stored in the above processing. As a result, the unique keyword of the guide is not used in the future assignment.

Steps S11120 to S11150 are processes in a case where feedback is the "correct answer". In a case where feedback for a guide that has been assigned by the guide assignment program 2600 with a certain unique keyword is the correct answer, the unique keyword use flag 2330 of the unique keyword is set to "Y" such that the unique keyword is used again. Since the guide which is the "correct answer" is indicated by the feedback, the processing proceeds to step S11190 in order to create a second guide message using information of the correct guide.

In step S11120, the guide assignment program 2600 determines whether the feedback selected in step S11060 is feedback for the guide assigned to the new arrival event. In the case of the feedback for the guide assigned to the new arrival event, the guide assignment program 2600 proceeds to step S11130. Otherwise, the guide assignment program 2600 proceeds to step S11190 to create the second guide message.

In step S11130, the guide assignment program 2600 refers to the assignment flag 2440 with the unique keyword in the assignment result table 2400 of the guide, and determines whether the unique keyword assignment flag 2440 is "Y". If the assignment flag 2440 with the unique keyword of the guide is "Y", the processing proceeds to step S11140 in order to use the unique keyword even in the next or subsequent assignment. Otherwise, the processing proceeds to step S11190.

In step S11140, the guide assignment program 2600 registers the unique keyword in the unique keyword table 2300. The guide assignment program 2600 performs the same process as the above-described step S11100, and proceeds to step S11150.

In step S11150, the guide assignment program 2600 stores "Y" in the unique keyword use flag 2330 of the row in which the guide ID 2310 and the unique keyword 2320 are stored. As a result, the unique keyword of the guide is also used in the future assignment. Thereafter, the guide assignment program 2600 proceeds to step S11190.

Steps S11160 to S11180 are processes in a case where a correct guide to be assigned to a new arrival event is not included in candidate guides, and thus, is not assigned to the new arrival event, but the correct guide is included in the guide table 2200. In such a case, the monitoring operator is caused to select the correct guide from the guide table, and a threshold of the guide is adjusted to an appropriate value such that the correct guide is included in the candidate guides when a similar event arrives in the next and subsequent times.

In step S11160, the guide assignment program 2600 displays the correct guide selection screen 13000 to be described later, causes the monitoring operator to select the correct guide from a guide list of the guide table 2200, and receives the correct guide.

In step S11170, the guide assignment program 2600 sets the threshold 2250 of the guide received in step S11600 to a value less than a similarity score between the guide message 2220 of the guide and the event message 2130 of the new arrival event. The guide was not selected as the candidate guide because the similarity score was below the threshold. Therefore, since the threshold is set to the value less than the similarity score, the similarity score exceeds the threshold to cause the guide to be selected as the candidate guide when the similar event arrives. As a method for setting a threshold less than a similarity score, a method of setting a value obtained by subtracting a certain minute value, such as 0.05, from the similarity score may be used, or another method may be used.

In step S11180, the threshold 2250 has been rewritten, and thus, the guide assignment program 2600 re-learns a regression device or the like used for threshold estimation as necessary.

In step S11190, the guide assignment program 2600 refers to the second guide message 2230 in the guide table 2200 of the guide for which the feedback has been received, and determines whether the second guide message 2230 exists. If a specific message is stored in the second guide message 2230, the second guide message already exists, and thus, the guide assignment program 2600 determines that it is unnecessary to create the second guide message, and proceeds to step S11220. Otherwise, the guide assignment program 2600 determines that it is necessary to create the second guide message, and proceeds to step S11200.

Steps S11200 and S11210 are processes of identifying a wildcard portion of a guide. It is necessary to identify the wildcard portion of a guide message in order to create the second guide message. In the present technology, the wildcard portion in the guide message is identified by taking a difference between the guide message in a correct guide and an event message to create the second guide message. The wildcard included in the guide message of the correct guide can be identified by taking the difference from the event message. This will be described by way of example.

When the guide message of the guide fed back as the correct answer to the new arrival event is different from the event message of the new arrival event, it is considered that the difference is based on the wildcard. For example, it is assumed that the guide with the guide ID of "G3" in the example of FIG. 3 is fed back as a correct guide for an event from the monitoring operator in a case where the event with an event message "Job net (report generation) has abnormally ended" has arrived as a new arrival event. In the guide message 2220 "Job net (job net name) has abnormally ended" with the guide ID of "G3", "job net name" is a wildcard portion. Since this wildcard portion corresponds to "report generation" of the event message, and the other character strings coincide, it is considered that this guide has been fed back as the correct guide. Since a specific character string is actually written in the event message for the character string of the wildcard portion of the guide message, the wildcard portion is different even if the other portions coincide. Therefore, it is considered that the wildcard portion can be identified by taking the difference between the guide message and the event message.

In step S11200, the guide assignment program 2600 acquires the difference between the guide message of the guide fed back as the correct answer to the new arrival event and the event message of the new arrival event.

In step S11210, the guide assignment program 2600 creates a second guide message, which is a guide message obtained by replacing the difference acquired in step S11200 with a machine-recognizable wildcard, and stores the second guide message in the second guide message 2230 of the guide table 2200.

In step S11220, the guide assignment program 2600 determines whether there is unprocessed feedback information among the pieces of feedback information acquired in step S11040. The guide assignment program 2600 returns to step S11060 if there is unprocessed feedback, and ends the processing if not.

Figure 17A:
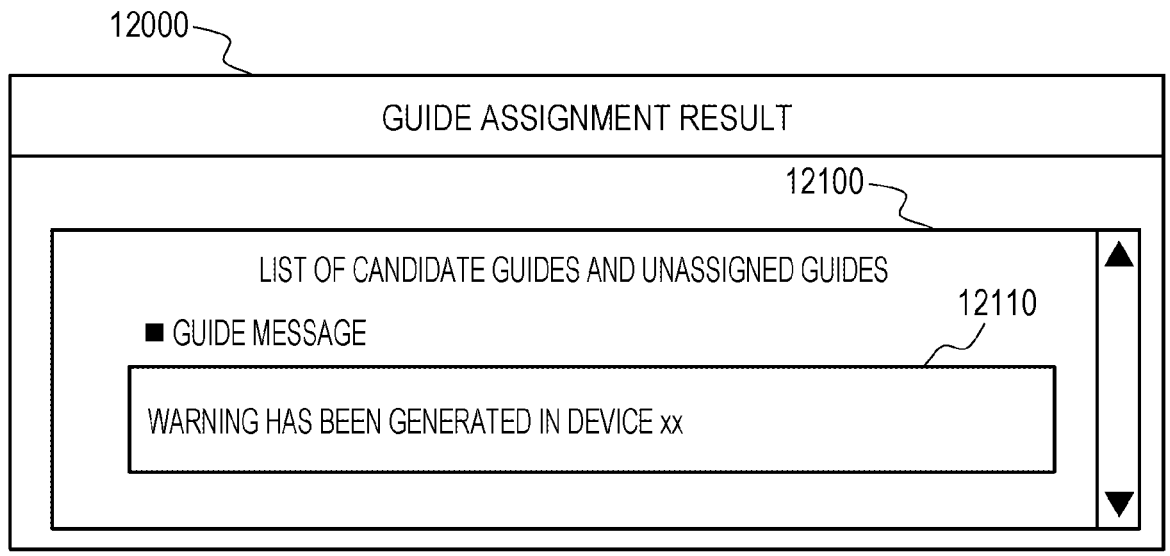
FIG. 17A is a view illustrating an example of a screen displaying a guide assignment result displayed in a case where no wildcard of a candidate guide is identified or in a case where there is no guide assigned using the second guide message in the first embodiment.

FIG. 17A is a view illustrating an example of a screen displaying a guide assignment result displayed in step S11000 in a case where no wildcard of a candidate guide is identified in step S7000 or in a case where there is no guide assigned using a second guide message in step S9000 in the first embodiment.

Figure 17B:
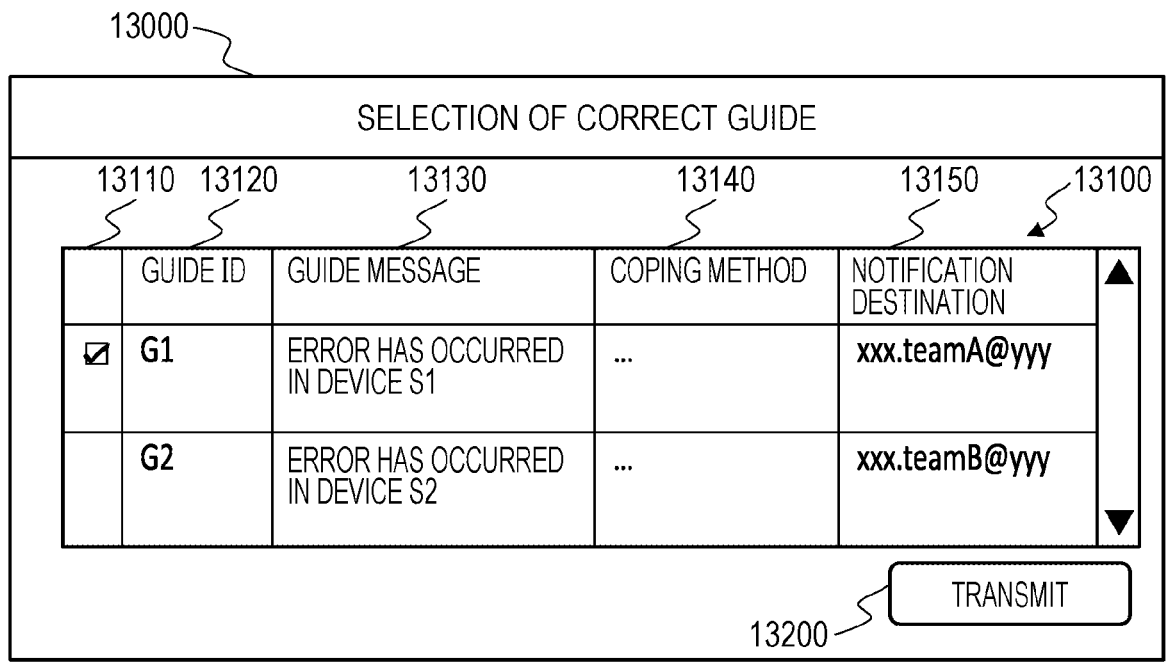
FIG. 17B is a view illustrating an example of an input reception screen of a correct guide displayed in the case where no wildcard of the candidate guide is identified or in the case where there is no guide assigned using the second guide message in the first embodiment.

FIG. 17B is a view illustrating an example of an input reception screen of a correct guide displayed in step S12000 in the case where no wildcard of the candidate guide is identified in step S7000 or in the case where there is no guide assigned using the second guide message in step S9000 in the first embodiment.

In the example of FIG. 17A, the guide assignment result screen 12000 has the candidate guide and unassigned guide list pane 12100. The candidate guide and unassigned guide list pane 12100 is a pane in which the guide assignment program 2600 displays information of a guide which is a candidate guide but has not been assigned for a new arrival event. The guide assignment program 2600 refers to the assignment result table 2400 and acquires data of the candidate guide.

The candidate guide and unassigned guide list pane 12100 is basically similar to that obtained by omitting the feedback input form from the information displayed in the candidate guide and unassigned guide list pane 9200 of the guide assignment result screen 9000. In FIG. 17A, if there are a plurality of candidate guides and unassigned guides in this pane, the guide assignment program 2600 can display information thereof in a scrollable manner.

In the example of FIG. 17B, the correct guide selection screen 13000 includes a correct guide input form 13100 and a transmit button 13200 to transmit the selected correct guide.

In the correct guide input form 13100, guide information of the guide table 2200 is displayed in each row. The guide assignment program 2600 refers to the guide table 2200 and displays a guide ID 13120, a guide message 13130, a coping method 13140, and a notification destination 13150 in each row of the correct guide input form 13100. These have the same formats as the guide ID 2210, the guide message 2220, the coping method 2260, and the notification destination 2280 of the guide table 2200, respectively.

The guide information displayed on the correct guide input form 13100 by the guide assignment program 2600 is not limited thereto, and other information included in the guide table 2200, for example, the second guide message 2230 or the like may be displayed. The order of guides displayed on the correct guide input form 13100 by the guide assignment program 2600 may be, for example, the ascending order of the guide ID 2210 as illustrated in FIG. 17B, may be the descending order of similarity score with a new arrival event, or may be displayed in any order. In FIG. 17B, the guide assignment program 2600 can display the guide information of the guide table 2200 on this form in a scrollable manner.

If there is a correct guide to be assigned to an event among the displayed guides, the monitoring operator selects the guide in a check box 13110 and presses the transmit button 13200 to transmit the guide. When the transmit button 13200 is selected, the guide assignment program 2600 starts the feedback processing in the case the assigned guide exists, and displays the guide assignment result screen 10000 to the superior administrator to notify the guide assignment result by the guide assignment program 2600 and the information of the guide finally selected by the operator.

Figure 18:
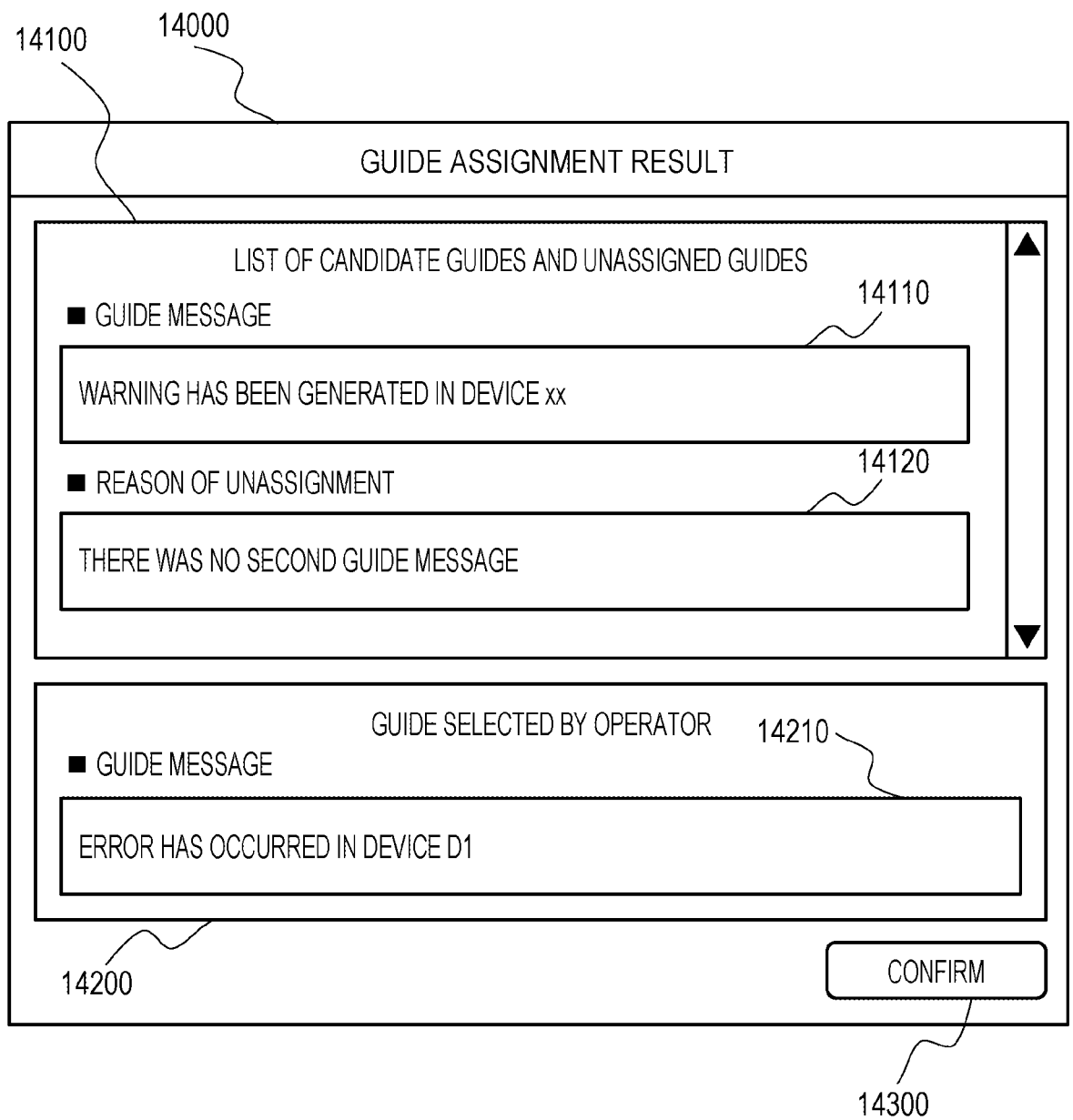
FIG. 18 is a view illustrating an example of a screen of a guide assignment result displayed to the superior administrator when the monitoring operator transmits feedback regarding an assignment result from a correct guide selection screen in a case where there is a candidate guide in the first embodiment.

FIG. 18 is a view illustrating an example of a screen of a guide assignment result displayed to the superior administrator when the monitoring operator transmits feedback regarding an assignment result from the correct guide selection screen 13000 in a case where there is a candidate guide in the first embodiment. The superior administrator can confirm information indicating whether there is no problem in the guide assignment by the guide assignment program 2600 and which guide the monitoring operator has selected as the correct guide by confirming the screen.

In the example of FIG. 18, a guide assignment result screen 14000 includes two panes which are a candidate guide and unassigned guide list pane 14100, and a pane 14200 of a guide selected by the operator.

The candidate guide and unassigned guide list pane 14100 is a pane in which the guide assignment program 2600 displays information of a guide, which is a candidate guide but has not been assigned for a new arrival event, and a basis of unassignment. This pane includes a guide message display section 14110 and a display section 14120 of a reason why assignment has not been performed. These display sections display the same information as the candidate guide and unassigned guide list pane 10200, and thus, the description thereof is omitted herein.

The pane 14200 of the guide selected by the operator is a pane that displays information of the guide fed back as a "correct answer" on the correct guide selection screen 13000. A format of the information displayed on the guide message display section 14210 is similar to the format of the guide message 13130 of the guide fed back as the correct guide. When the new arrival event has been registered, a guide message 11200 registered as the new arrival event may be displayed in this pane, or nothing may be displayed.

As described above, the superior administrator confirms the assignment result by the guide assignment program 2600 and the selection of the correct guide by the monitoring operator. When there is no problem in the assignment result, a confirm button 14300 is selected to end the screen. If an abnormality is confirmed in the assignment result, the superior administrator takes an appropriate countermeasure by modifying the guide or modifying the guide assignment program 2600.

Figure 19A:
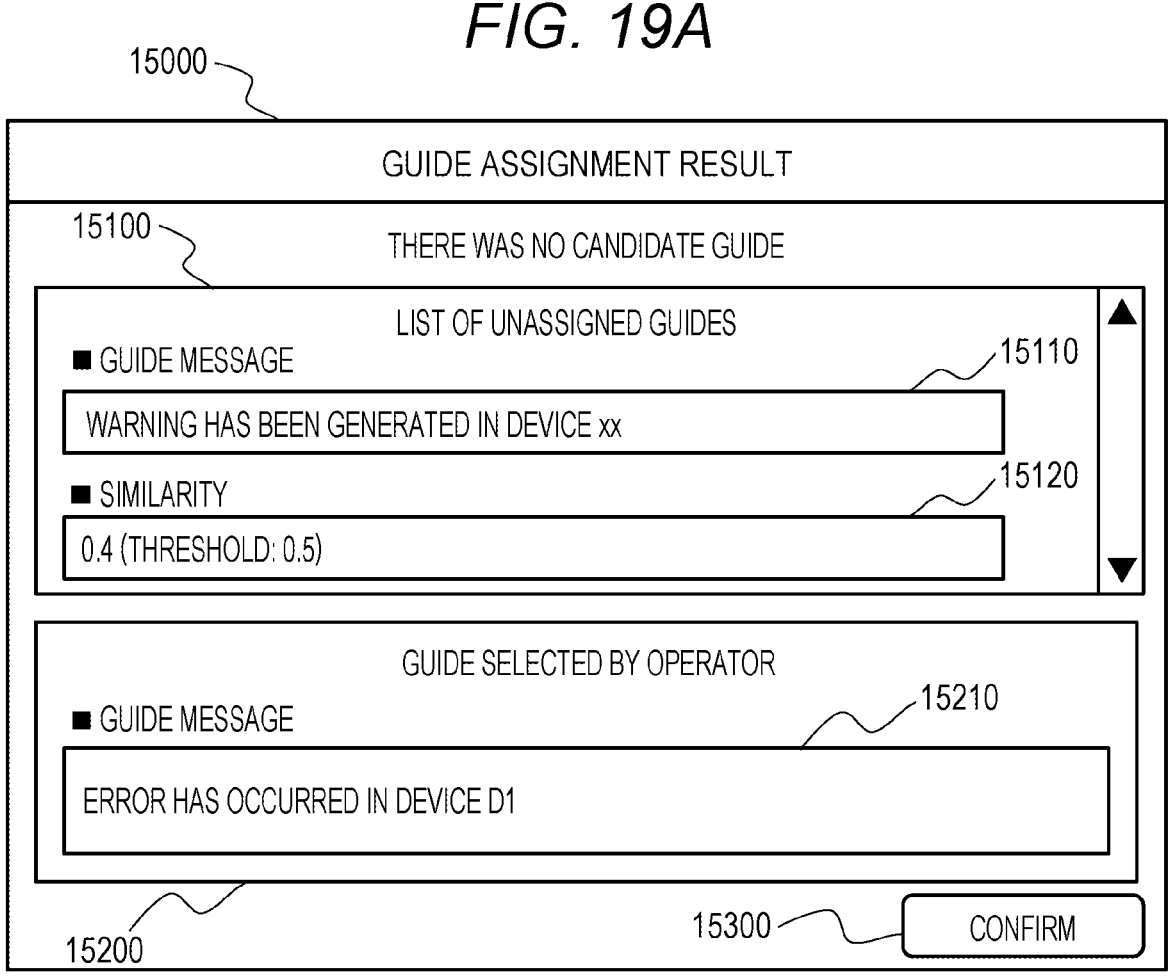
FIG. 19A is a view illustrating an example of a screen of a guide assignment result displayed to the superior administrator when the monitoring operator transmits the feedback regarding the assignment result from the correct guide selection screen in a case where there is no candidate guide in the first embodiment.

FIG. 19A is a view illustrating an example of a screen of a guide assignment result displayed to the superior administrator when the monitoring operator transmits the feedback regarding the assignment result from the correct guide selection screen 13000 in a case where there is no candidate guide in the first embodiment.

Figure 19B:
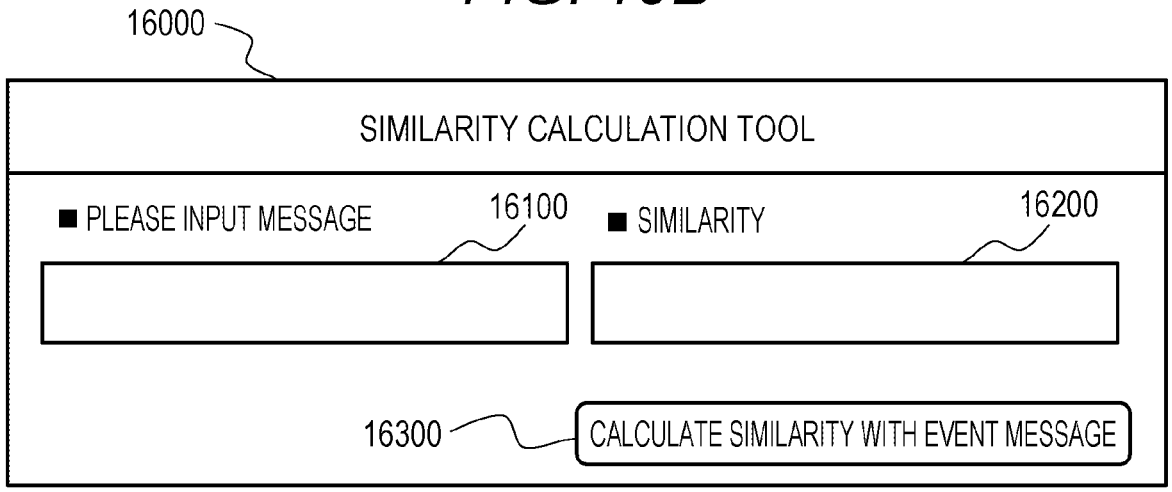
FIG. 19B is a view illustrating an example of a screen of a similarity calculation tool that allows the superior administrator to calculate a similarity score between an appropriate guide message and a new arrival event when the monitoring operator transmits the feedback regarding the assignment result from the correct guide selection screen in the case where there is no candidate guide in the first embodiment.

FIG. 19B is a view illustrating an example of a screen of a similarity calculation tool that allows the superior administrator to calculate a similarity score between the appropriate guide message 2220 and the new arrival event when the monitoring operator transmits the feedback regarding the assignment result from the correct guide selection screen 13000 in the case where there is no candidate guide in the first embodiment.

The superior administrator can confirm information indicating whether there is no problem in guide assignment by the guide assignment program 2600 and which guide the monitoring operator has selected as a correct guide by confirming a guide assignment result screen 15000. Further, there is a case where the superior administrator corrects the guide when confirming an abnormality in the assignment result. At that time, it is convenient if it is possible to easily calculate how the similarity score with the new arrival event changes with what kind of modification, and this calculation can be performed from a similarity calculation tool screen 16000.

In the example of FIG. 19A, the guide assignment result screen 15000 displays a sentence "There was no candidate guide", and includes two panes which are an unassigned guide list pane 15100 and a pane 15200 of a guide selected by the operator.

The unassigned guide list pane 15100 is a pane that displays a list of guides which are not candidate guides and have not been assigned. The guide assignment program 2600 refers to the guide table 2200, acquires a data list of the guides, and displays information of the guides, for example, in descending order of similarity score with the new arrival event. A format of the information displayed on a guide message display section 15110 is similar to the format of the guide message 2220 of the guide table 2200, and the similarity score with the new arrival event is displayed on a similarity display section 15120. Further, the threshold 2250 of the guide may be displayed together. In FIG. 19A, if there are a plurality of unassigned guides, the guide assignment program 2600 can display information thereof in the unassigned guide list pane 15100 in a scrollable manner.

The pane 15200 of the guide selected by the operator is a pane that displays information of the guide fed back as the "correct answer" on the correct guide selection screen 13000 and displays contents similar to those of the pane 14200 of the guide selected by the operator, and thus, the description thereof is omitted herein.

In the example of FIG. 19B, the similarity calculation tool screen 16000 includes a guide message input form 16100 to input an appropriate guide message, a similarity score display section 16200, and a button 16300 for calculating the similarity with the event message.

The superior administrator inputs the appropriate guide message to calculate the similarity with the new arrival event in the guide message input form 16100.

As the superior administrator selects the button 16300 for calculating the similarity with the event message after inputting the guide message in the guide message input form 16100, the guide assignment program 2600 calculates a similarity score between the new arrival event and the guide message input in the guide message input form 16100, and displays the result on the similarity score display section 16200.

Figure 20:
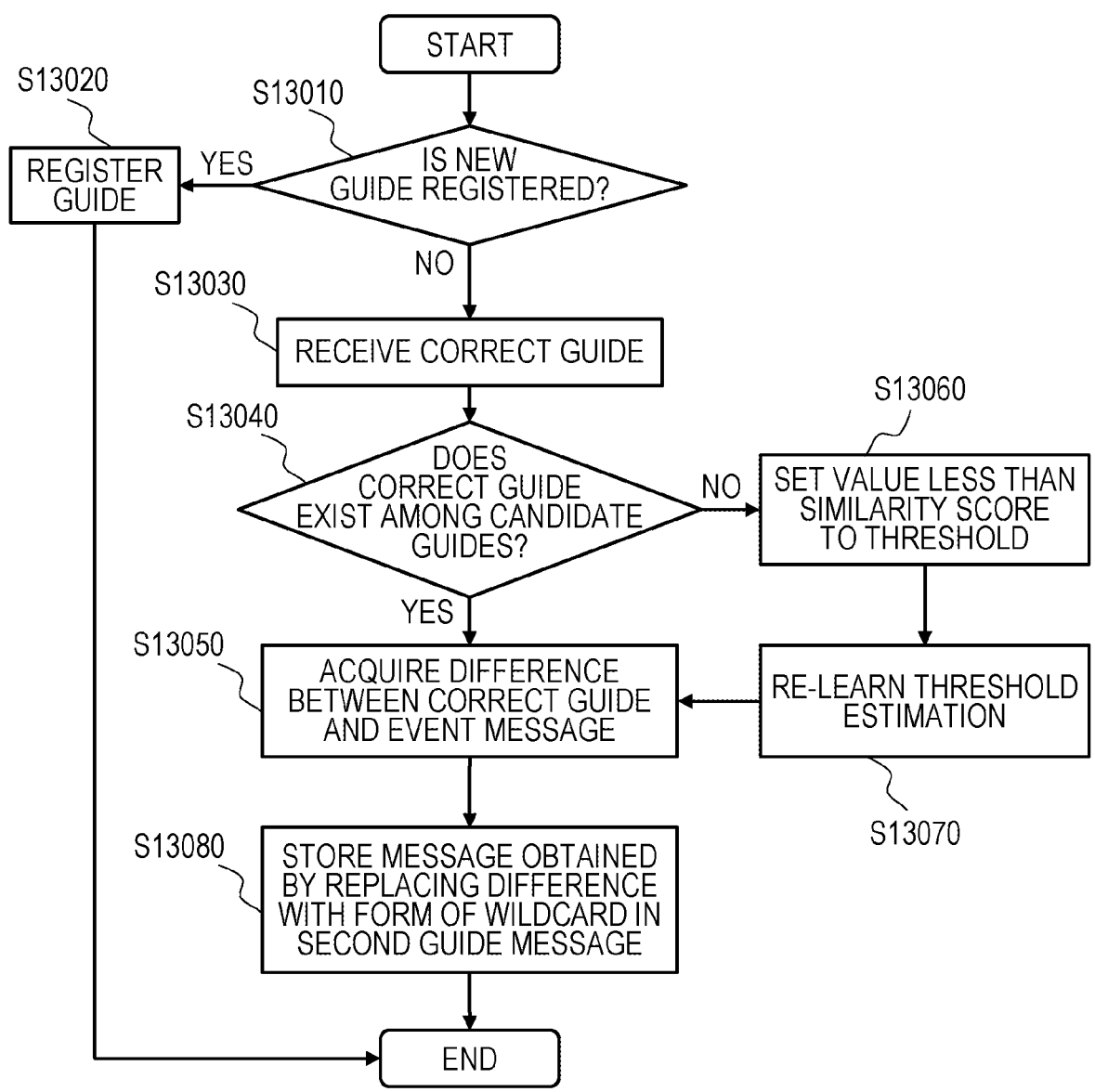
FIG. 20 is a flowchart illustrating an example of a flow of feedback processing with respect to a guide assignment result in a case where there is no guide assigned to the new arrival event in the first embodiment.

FIG. 20 is a flowchart illustrating an example of a flow of feedback processing with respect to a guide assignment result in a case where there is no guide assigned to the new arrival event in the first embodiment. This processing is executed by the guide assignment program 2600 as processing for feedback in a case where the monitoring operator inputs a new guide from the new guide registration screen 11000 and selects the determination button 11600 or in a case where a correct guide for the new arrival event is selected from the correct guide selection screen 13000 and the transmit button 13200 is selected.

In step S13010, the guide assignment program 2600 determines whether the determination button 11600 on the new guide registration screen 11000 has been selected and new guide registration has been performed. The guide assignment program 2600 proceeds to step S13020 if the new guide registration has been performed, and proceeds to step S13030 if not.

Step S13020 is a process of registering the new guide in the guide table 2200, and is similar to the above-described step S11030.

In step S13030, the guide assignment program 2600 acquires information of the correct guide for the new arrival event selected from the correct guide selection screen 13000.

In step S13040, the guide assignment program 2600 determines whether the correct guide acquired in step S13030 exists among candidate guides. The guide assignment program 2600 proceeds to step S13050 if the correct guide exists among the candidate guide, and proceeds to step S13060 for threshold adjustment if not.

Steps S13050 and S13080 are processes of creating the second guide message 2230, and are processes similar to the above-described steps S11170 and S11180.

Steps S13060 and S13070 are processes of adjusting a threshold for a guide, and are processes similar to the above-described steps S11170 and S11180.

When the process in step S13020 or step S13080 is completed, the guide assignment program 2600 completes the processing.

Second Embodiment

Hereinafter, a second embodiment of the present invention will be described. Except for differences to be described below, each unit of a system of the second embodiment has the same function as each unit denoted by the same reference sign in the first embodiment illustrated in FIGS. 1 to 20, and thus, the description thereof will be omitted.

Figure 21:
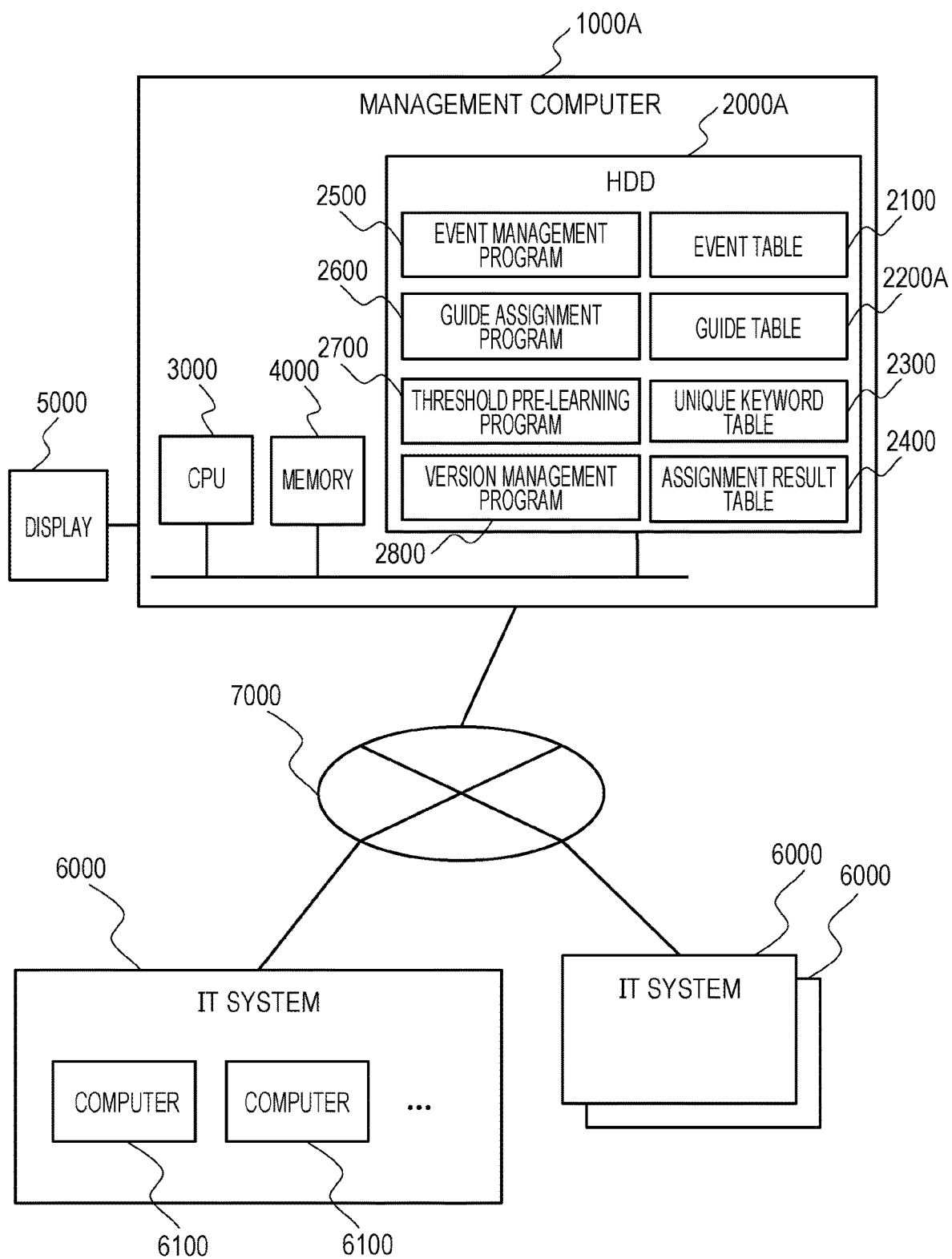
FIG. 21 is a block diagram illustrating a configuration of an event monitoring system according to a second embodiment.

FIG. 21 is a block diagram illustrating a configuration of an event monitoring system according to the second embodiment. Here, differences from the first embodiment in the configuration of the second embodiment will be mainly described.

The event monitoring system according to the second embodiment includes a management computer 1000A and the display 5000, and monitors an event from the IT system 6000, which is similar to the first embodiment.

The management computer 1000A is a computer that executes a version management program 2800 in addition to the event management program 2500, the guide assignment program 2600, and the threshold pre-learning program 2700 similar to those in the first embodiment.

The management computer 1000A includes a hard disk drive (HDD) 2000A, the CPU 3000, and the memory 4000. The HDD 2000A stores the event management program 2500, the guide assignment program 2600, the threshold pre-learning program 2700, and the version management program 2800, the event table 2100, a guide table 2200A, the unique keyword table 2300, and the assignment result table 2400 in which data to be referred to by these programs has been recorded. The event table 2100, the unique keyword table 2300, and the assignment result table 2400 have configurations similar to those of the management computer 1000. The version management program 2800 is loaded into the memory 4000 and executed on the CPU 3000. That is, processing executed by the version management program 2800 in the following description is actually executed by the CPU 3000 according to the version management program 2800. Further, functions of the above-described programs are not limited to those implemented by a single device, and may be implemented by a plurality of devices connected to be capable of communicating with each other.

The guide message 2220 is not fixed and is sometimes modified by a monitoring operator or a superior administrator. The version management program 2800 manages versions of the guide message 2220 and the second guide message 2230 in the guide table 2200A. When the guide message 2220 of a certain guide is updated by a guide update form (not illustrated) or the second guide message 2230 is created or updated, the version management program 2800 stores such a version in the guide table 2200A.

When the guide message 2220 is modified by the monitoring operator or the superior administrator, there is a possibility that a guide that should not be assigned is assigned to an event unless the second guide message 2230 is modified in accordance with the modification of the guide message 2220. However, even when the guide message 2220 is updated, the second guide message 2230 is not automatically updated, but is created or updated only by receiving feedback of a correct guide from the monitoring operator in response to the event. An object of the version management program 2800 is to prevent the second guide message 2230, created when the old guide message 2220 is held, from being used in matching using a second guide message by providing information indicating when the guide message 2220 and the second guide message 2230 have been updated.

FIG. 22 is a table illustrating a configuration example of the guide table 2200A according to the second embodiment. Each row of the guide table 2200A stores a guide message version 2225 indicating a version when the guide message 2220 has been updated and a second guide message version 2235 indicating a version when the second guide message has been updated, in addition to the guide ID 2210, the guide message 2220, the second guide message 2230, the wildcard range 2240, the threshold 2250, the coping method 2260, the notification necessity determination rule 2270, and the notification destination 2280 similar to those of the guide table 2200.

The latest version is stored in the guide message version 2225 when the guide message 2220 is newly updated. For example, in a case where the latest version of the guide message 2220 so far is V1.5 and the guide message 2220 of a certain guide is newly updated thereafter, the guide message 2220 of the guide is updated, and a version newer than V1.5, for example, V1.6, is set to the guide message version 2225. When a plurality of the guide messages 2220 are updated simultaneously, the same version is set to the guide message versions 2225 of guides thereof.

The second guide message version 2235 stores the guide message version 2225 of the guide message 2230 used as a source for creating the second guide message 2230 when the second guide message 2220 of a certain guide is created or updated. If the second guide message 2230 is "n/a" and has not been created, "n/a" is also stored in the second guide message version 2235.

Figure 23:
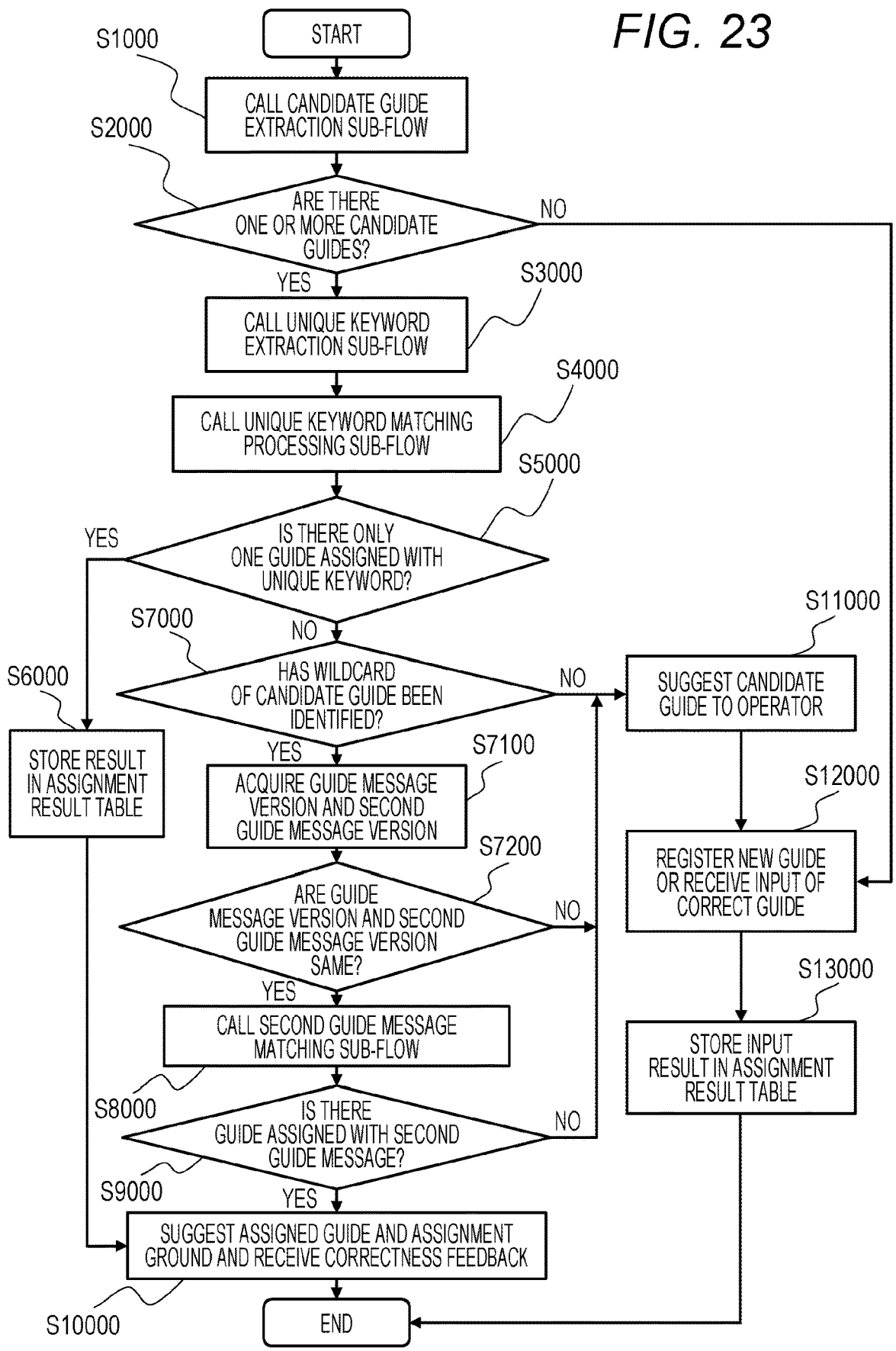
FIG. 23 is a flowchart illustrating an example of a flow of guide assignment processing for a new arrival event according to the second embodiment.

FIG. 23 is a flowchart illustrating an example of a flow of guide assignment processing for a new arrival event according to the second embodiment. This processing is executed by the guide assignment program 2600 as processing for an event after the event management program 2500 receives the new arrival event and registers data of the event in the event table 2100. This processing is similar to the processing of the flowchart of FIG. 6 except that steps S7100 and S7200 are added.

In step S7000, the guide assignment program 2600 determines whether a wildcard of a candidate guide has been identified similarly to the flowchart of FIG. 6. The guide assignment program 2600 proceeds to step S7100 if the wildcard of the candidate guide has been identified, and proceeds to step S11000 if not.

In step S7100, the guide assignment program 2600 refers to the guide table 2200A, acquires the guide message version 2225 and the second guide message version 2235 of the candidate guide, and proceeds to step S7200.

In step S7200, the guide assignment program 2600 compares the guide message version 2225 of the candidate guide acquired in step S7100 with the second guide message version 2235, and determines whether there is a candidate guide having the second guide message version 2235 of the same version as the guide message version 2225. If there is a candidate guide having the second guide message version 2235 of the same version as the guide message version 2225, the guide assignment program 2600 determines that the matching using the second guide message is possible, and proceeds to step S8000. Otherwise, the guide assignment program 2600 determines that it is difficult to perform the matching using the second guide message, and proceeds to step S11000.

Figure 24:
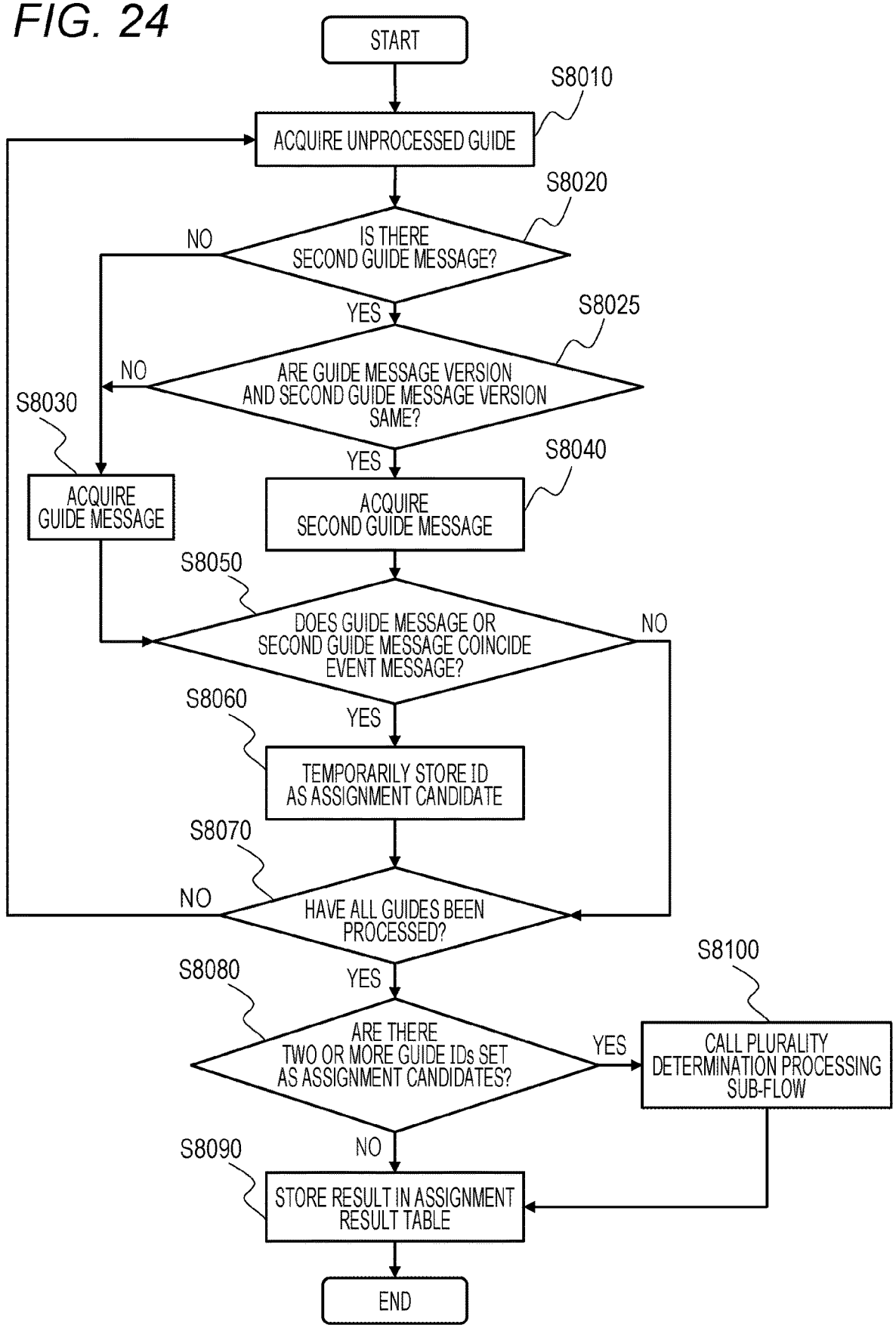
FIG. 24 is a sub-flowchart illustrating an example of a flow of assignment processing using a second guide message according to the second embodiment.

FIG. 24 is a sub-flowchart illustrating an example of a flow of assignment processing using the second guide message according to the second embodiment. This processing is executed by the guide assignment program 2600 in step S8000 in the flowchart illustrating the example of the flow of the guide assignment processing for the new arrival event. This processing is similar to the processing of the flowchart of FIG. 10 except that step S8025 is added.

In step S8020, the guide assignment program 2600 refers to the second guide message 2230 in the guide table 2200A, and determines whether the second guide message 2230 exists in the guide acquired in step S8010. If a specific character string is stored in the second guide message 2230, the guide assignment program 2600 determines that a wildcard of the guide has been identified, and proceeds to step S8025. If the second guide message 2230 does not store the specific character string but stores "n/a", the guide assignment program 2600 determines that the wildcard of the guide has not been identified, and proceeds to step S8030.

In step S8025, the guide assignment program 2600 refers to the guide message version 2225 and the second guide message version 2235 of the guide in the guide table 2200A, and determines whether the guide message version 2225 and the second guide message version 2235 coincide. If the guide message version 2225 and the second guide message version 2235 coincide, the guide assignment program 2600 determines that the second guide message 2230 can be used for matching with the event message 2130, and proceeds to step S8040. If the second guide message version 2235 is older than and does not coincide with the guide message version 2225, the guide assignment program 2600 determines that the second guide message 2230 is not usable for the matching with the event message 2130, and proceeds to step S8030.

Further, the system in the embodiments of the present invention may be configured as follows.

(1) An event monitoring system includes a processor (for example, the CPU 3000) and a storage (for example, at least one of the memory 4000 and the HDD 2000). The storage unit holds an event message (for example, the event message 2130) including a character string related to an event occurring in an information system and guide information (for example, the guide table 2200A) including one or more guides. The guide includes a guide message (for example, the guide message 2220) including a predetermined character string, notified in response to the event, and information (for example, at least one of the coping method 2260, the notification necessity determination rule 2270, and the notification destination 2280) regarding a coping method for the event. The processor compares the event message and the guide (for example, step S8000), associates the guide with the event in a case where the guide further includes information for identifying a variable portion of the guide message and a portion other than the variable portion of the guide message matches a portion other than a portion which corresponds to the variable portion, of the event message (for example, step S8090), and receives an input of information indicating a correct answer of a guide to be associated with the event in a case where the guide does not include the information for identifying the variable portion (for example, step S12000).

As a result, it is possible to appropriately determine whether to assign the guide to the event for each guide even in a case where a wildcard is included in the guide message.

(2) In the above (1), the processor compares a guide message included in the correct answer of the guide to be associated with the event and the event message to identify a variable portion of the guide message when the information indicating the correct answer of the guide to be associated with the event is input (for example, step S11200), and updates the guide information to include the information for identifying the variable portion of the guide message (for example, step S11210).

As a result, a second guide message including the wildcard can be created.

(3) In the above (2), the processor compares the character string of the guide message included in the correct answer of the guide to be associated with the event and the character string of the event message, and identifies a different portion therebetween as the variable portion (for example, steps S11200 and S11210).

As a result, the appropriate wildcard can be set.

(4) In the above (1), the storage unit holds a threshold (for example, the threshold 2250) of a similarity between the event message and the guide message. The processor calculates the similarity between the event message and the guide message included in the guide (for example, S1010), causes the storage unit to hold the guide including the guide message of which the similarity exceeds the threshold as a candidate guide (for example, step S1070), determines whether the candidate guide includes the information for identifying the variable portion (for example, step S7000), outputs the candidate guide in a case where the candidate guide does not include the information for identifying the variable portion (for example, step S11000), and receives information for selecting the candidate guide as the input of the information indicating the correct answer of the guide to be associated with the event in a case where the information for selecting the candidate guide is input (for example, step S12000).

As a result. it is possible to create the second guide message including the wildcard.

(5) In the above (4), the processor does not select any guide including the guide message whose similarity exceeds the threshold as the correct answer of the guide to be associated with the event, and changes the threshold to a value lower than a similarity between the event message and a guide message included in the correct answer of the guide to be associated with the event when any guide including the guide message whose similarity does not exceed the threshold is input as the information indicating the correct answer of the guide to be associated with the event (for example, step S11170).

As a result, it is possible to set the appropriate threshold such that the guide that needs to be the correct answer is extracted as the candidate.

(6) In the above (4), the processor holds the guide as a candidate guide to be associated with the event when the guide does not include the information for identifying the variable location and the guide message included in the guide coincides with the event message (for example, steps S8030 and S8060), holds the guide as a candidate guide to be associated with the event when the guide includes the information for identifying the variable portion and the portion other than the variable portion in the guide message included in the guide coincides with the portion other than the portion corresponding to the variable portion in the event message (for example, steps S8040 and S8060), and associates the candidate guides to be associated with the event with the event (for example, step S8090).

As a result, the appropriate guide can be assigned.

(7) In the above (6), the guide information includes information (for example, the notification destination 2280) indicating a notification destination of the guide message, and includes information (for example, the wildcard range 2240) indicating an allowable range of a character string of the variable portion for a guide including the information for identifying the variable portion. When a plurality of candidate guides to be associated with the event are held (for example, step S8080: Yes), the processor does not associate a first candidate with the event in a case where a notification destination of the first candidate among the plurality of candidate guides to be associated with the event is similar to a notification destination of a second candidate and variable portions of the second candidate are fewer than variable portions of the first candidate (for example, step S8130: No, step S8180), and does not associate the first candidate with the event in a case where the notification destination of the first candidate is similar to the notification destination of the second candidate, the variable portions of the first candidate are similar to the variable portions of the second candidate, and a portion corresponding to the variable portion in the event message is out of the allowable range set for the first candidate (for example, step S8160: No, step S8180).

As a result, an appropriate guide can be assigned even when the plurality of guide candidates to be assigned exist.

(8) In the above (6), the processor identifies a word included in only one guide among words, included in a plurality of guides identified as the candidate guides, as a unique keyword (for example, step S3040), and associates the guide with the event when the guide includes the unique keyword and a character string similar to the unique keyword is included in the event message (for example, step S6000).

As a result, the appropriate guide can be assigned based on the unique keyword.

(9) In the above (8), the processor causes the storage unit to hold information indicating that the unique keyword is not used to associate the guide with the event when information indicating that the guide is not correct is input after associating the guide including the unique keyword with the event that has the event message including the unique keyword (for example, step S11110), and associates the guide with the event when the guide includes the unique keyword, the unique keyword is included in the event message, and information indicating that the unique keyword is not used is not held (for example, step S4030: No, S4040: Yes).

As a result, the appropriate guide can be assigned based on the unique keyword.

(10) In the above (8), the processor outputs at least any of a guide associated with the event and a reason why the guide is associated with the event in a case where a candidate guide to be associated with the event is associated with the event, and a guide not associated with the event and a reason why the guide is not associated with the event in a case where a candidate guide to be associated with the event is not associated with the event. The reason why the guide is associated with the event and the reason why the guide is not associated with the event include at least any of information indicating whether the guide includes the unique keyword and the unique keyword is included in the event message, information indicating whether the guide message coincides with the event message, and information indicating whether the portion other than the variable portion in the guide message coincides with the portion other than the portion corresponding to the variable portion in the event message (for example, FIGS. 13, 14, and 18).

As a result, appropriate information regarding the guide assignment is provided to an operator and the like.

(11) In the above (1), the guide information includes information (for example, the wildcard range 2240) indicating an allowable range of a character string of the variable portion for a guide including the information for identifying the variable portion. The processor associates the guide including the guide message with the event when the portion other than the variable portion in the guide message coincides with the portion other than the portion corresponding to the variable portion in the event message and the portion corresponding to the variable portion in the event message falls within the allowable range (for example, step S8060).

As a result, the appropriate guide can be assigned.

(12) In the above (1), the guide information includes information indicating a version of the guide message (for example, the guide message version 2225), and information indicating a version (for example, a second guide message version) of the information for identifying the variable portion of the guide message. The processor determines that the guide does not include the information for identifying the variable portion when the guide includes the information for identifying the variable portion of the guide message of an older version than the version of the guide message (for example, step S7200: No).

As a result, the old second guide message is not used for determination of the assignment, and the appropriate guide can be assigned.

Note that the present invention is not limited to the above-described embodiment, but includes various modifications. For example, the above-described embodiments have been described in detail in order to facilitate understanding of the present invention, and the invention is not necessarily limited to include the entire configuration described above. Further, some configurations of a certain embodiment can be replaced by configurations of another embodiment, and further, a configuration of another embodiment can be added to a configuration of a certain embodiment. Further, addition, deletion or substitution of other configurations can be made with respect to some configurations of each embodiment.

Further, a part or all of each of the above-described configurations, functions, processing units, processing means, and the like may be realized, for example, by hardware by designing with an integrated circuit and the like. Further, the above-described respective configurations, functions and the like may be realized by software by the processor interpreting and executing a program for realizing the respective functions. Information such as programs, tables, and files that realize the respective functions can be stored in a storage device such as a nonvolatile semiconductor memory, a hard disk drive, and a solid state drive (SSD), or a computer-readable non-transitory data storage medium such as an IC card, an SD card, and a DVD.

Further, only control lines and information lines considered to be necessary for the description have been illustrated, and all of the control lines and information lines required as a product are not necessarily illustrated. It may be considered that most of configurations are practically connected to each other.

What is claimed is:

1. An event monitoring system comprising:
a processor; and
a storage unit,
wherein the storage unit holds an event message including a character string related to an event occurring in an information system and guide information including one or more guides,
the guide includes a guide message including a predetermined character string, notified in response to the event, and information regarding a coping method for the event,
the processor
compares the event message and the guide,
associates the guide with the event in a case where the guide further includes information for identifying a variable portion of the guide message and a portion other than the variable portion of the guide message coincides with a portion other than a portion corresponding to the variable portion in the event message, and receives an input of information indicating a correct answer of a guide to be associated with the event in a case where the guide does not include the information for identifying the variable portion.

2. The event monitoring system according to claim 1, wherein the processor compares a guide message included in the correct answer of the guide to be associated with the event and the event message to identify a variable portion of the guide message when the information indicating the correct answer of the guide to be associated with the event is input, and updates the guide information to include the information for identifying the variable portion of the guide message.

3. The event monitoring system according to claim 2, wherein the processor compares a character string of the guide message included in the correct answer of the guide to be associated with the event and the character string of the event message, and identifies a different portion between the character string of the guide message and the character string of the event message as the variable portion.

4. The event monitoring system according to claim 1, wherein the storage unit holds a threshold of a similarity between the event message and the guide message, and the processor calculates the similarity between the event message and the guide message included in the guide, causes the storage unit to hold the guide including the guide message of which the similarity exceeds the threshold as a candidate guide, determines whether the candidate guide includes the information for identifying the variable portion, outputs the candidate guide in a case where the candidate guide does not include the information for identifying the variable portion, and receives information for selecting the candidate guide as the input of the information indicating the correct answer of the guide to be associated with the event in a case where the information for selecting the candidate guide is input.

5. The event monitoring system according to claim 4, wherein the processor does not select any of the guides including the guide messages each having the similarity exceeding the threshold as the correct answer of the guide to be associated with the event, and changes the threshold to a value lower than a similarity between the event message and a guide message included in the correct answer of the guide to be associated with the event when any of the guides including the guide messages each having the similarity that does not exceed the threshold is input as the information indicating the correct answer of the guide to be associated with the event.

6. The event monitoring system according to claim 4, wherein the processor holds the guide as a candidate guide to be associated with the event when the guide does not include the information for identifying the variable portion and the guide message included in the guide coincides with the event message, holds the guide as a candidate guide to be associated with the event when the guide includes the information for identifying the variable portion and the portion other than the variable portion in the guide message included in the guide coincides with the portion other than the portion corresponding to the variable portion in the event message, and associates the candidate guides to be associated with the event with the event.

7. The event monitoring system according to claim 6, wherein the guide information includes information indicating a notification destination of the guide message, and includes information indicating an allowable range of a character string of the variable portion for a guide including the information for identifying the variable portion, and when a plurality of candidate guides to be associated with the event are held, the processor does not associate a first candidate with the event in a case where a notification destination of the first candidate among the plurality of candidate guides to be associated with the event is similar to a notification destination of a second candidate and variable portions of the second candidate are fewer than variable portions of the first candidate, and does not associate the first candidate with the event in a case where the notification destination of the first candidate is similar to the notification destination of the second candidate, the variable portions of the first candidate are similar to the variable portions of the second candidate, and a portion corresponding to the variable portion in the event message is out of the allowable range set for the first candidate.

8. The event monitoring system according to claim 6, wherein the processor identifies a word included in only one guide among words, included in a plurality of guides identified as the candidate guides, as a unique keyword, and associates the guide with the event when the guide includes the unique keyword and a character string similar to the unique keyword is included in the event message.

9. The event monitoring system according to claim 8, wherein the processor causes the storage unit to hold information indicating that the unique keyword is not used to associate the guide with the event when information indicating that the guide is not correct is input after associating the guide including the unique keyword with the event that has the event message including the unique keyword, and associates the guide with the event when the guide includes the unique keyword, the unique keyword is included in the event message, and information indicating that the unique keyword is not used is not held.

10. The event monitoring system according to claim 8, wherein the processor outputs at least any of a guide associated with the event and a reason why the guide is associated with the event in a case where a candidate guide to be associated with the event is associated with the event, and a guide not associated with the event and a reason why the guide is not associated with the event in a case where a candidate guide to be associated with the event is not associated with the event, the reason why the guide is associated with the event and the reason why the guide is not associated with the event include at least any of information indicating whether the guide includes the unique keyword and the unique keyword is included in the event message, information indicating whether the guide message coincides with the event message, and information indicating whether the portion other than the variable portion in the guide message coincides with the portion other than the portion corresponding to the variable portion in the event message.

11. The event monitoring system according to claim 1, wherein the guide information includes information indicating an allowable range of a character string of the variable portion for a guide including the information for identifying the variable portion, and the processor associates the guide including the guide message with the event when the portion other than the variable portion in the guide message coincides with the portion other than the portion corresponding to the variable portion in the event message and the portion corresponding to the variable portion in the event message falls within the allowable range.

12. The event monitoring system according to claim 1, wherein the guide information includes information indicating a version of the guide message and information indicating a version of the information for identifying the variable portion of the guide message, and the processor determines that the guide does not include the information for identifying the variable portion when the guide includes the information for identifying the variable portion of the guide message of an older version than the version of the guide message.

13. An event monitoring method executed by an event monitoring system which includes a processor and a storage unit, the storage unit holding an event message that includes a character string related to an event occurring in an information system and guide information that includes one or more guides, the guide including a guide message that includes a predetermined character string, notified in response to the event, and information regarding a coping method for the event, the event monitoring method comprising:

causing the processor to compare the event message and the guide;

causing the processor to associate the guide with the event in a case where the guide further includes information for identifying a variable portion of the guide message and a portion other than the variable portion of the guide message coincides with a portion other than a portion corresponding to the variable portion in the event message; and causing the processor to receive an input of information indicating a correct answer of a guide to be associated with the event in a case where the guide does not include the information for identifying the variable portion.

* * * * *